United States Patent
Kempf et al.

(10) Patent No.: US 7,375,760 B2
(45) Date of Patent: May 20, 2008

(54) CONTENT-DEPENDENT SCAN RATE CONVERTER WITH ADAPTIVE NOISE REDUCTION

(75) Inventors: Jeffrey Kempf, Dallas, TX (US);
Arnold P. Skoog, Carrollton, TX (US);
Clifford D. Fairbanks, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1107 days.

(21) Appl. No.: 10/334,555

(22) Filed: Dec. 31, 2002

(65) Prior Publication Data
US 2003/0156301 A1 Aug. 21, 2003

Related U.S. Application Data

(60) Provisional application No. 60/345,731, filed on Dec. 31, 2001.

(51) Int. Cl.
*H04N 7/01* (2006.01)
*H04N 11/20* (2006.01)
*H04N 5/74* (2006.01)
(52) U.S. Cl. .................. 348/441; 348/453; 348/448; 348/451; 348/750
(58) Field of Classification Search .......... 348/441, 348/448, 450–453, 458, 459, 626, 625, 630, 348/750, 758; *H04N 7/01, 11/20, 5/21, 5/74*
See application file for complete search history.

(56) References Cited

U.S. PATENT DOCUMENTS

| 5,398,071 | A | 3/1995 | Gove et al. |
| 5,519,451 | A | 5/1996 | Clatanoff et al. |
| 5,550,592 | A | 8/1996 | Markandey et al. |
| 5,864,367 | A | 1/1999 | Clatanoff et al. |
| 6,124,900 | A | 9/2000 | Clatanoff et al. |
| 6,320,620 | B1 * | 11/2001 | Markandey et al. ........ 348/448 |
| 7,154,556 | B1 * | 12/2006 | Wang et al. ............... 348/452 |

* cited by examiner

*Primary Examiner*—Sherrie Hsia
(74) *Attorney, Agent, or Firm*—Charles A. Brill; Wade James Brady, III; Frederick J. Telecky, Jr.

(57) ABSTRACT

A content-dependent scan rate converter with adaptive noise reduction that provides a highly integrated, implementation efficient de-interlacer. By identifying and using redundant information from the image (motion values and edge directions), this scan rate converter is able to perform the tasks of film-mode detection, motion-adaptive scan rate conversion, and content-dependent video noise reduction. Adaptive video noise reduction is incorporated in the process where temporal noise reduction is performed on the still parts of the image, thus preserving high detail spatial information, and data-adaptive spatial noise reduction is performed on the moving parts of the image. A low-pass filter is used in flat fields to smooth out Gaussian noise and a direction-dependent median filter is used in the presence of impulsive noise or an edge. Therefore, the selected spatial filter is optimized for the particular pixel that is being processed to maintain crisp edges.

33 Claims, 13 Drawing Sheets

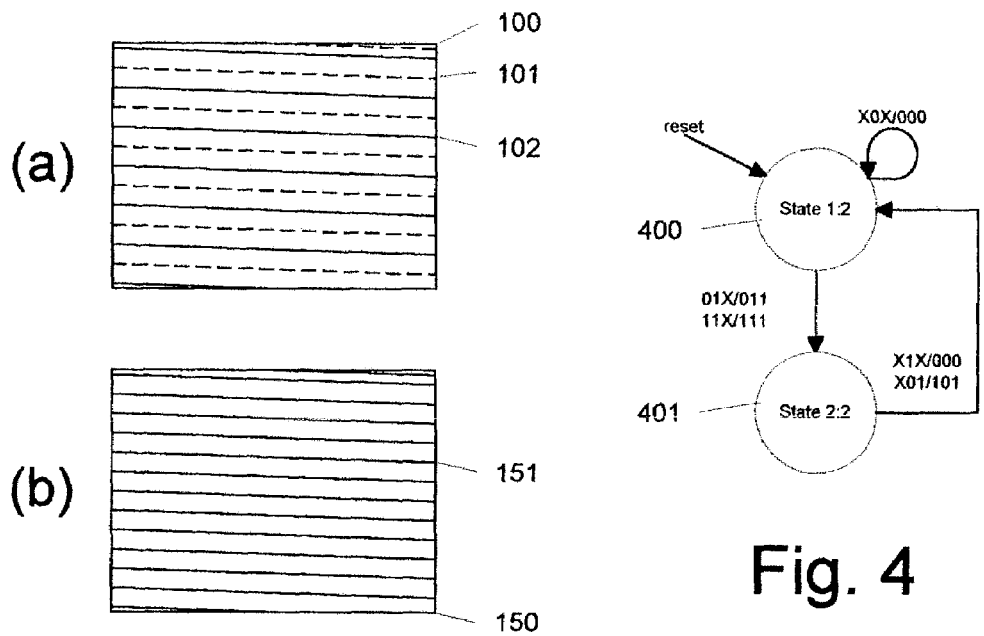
Fig. 1 prior art
Fig. 4
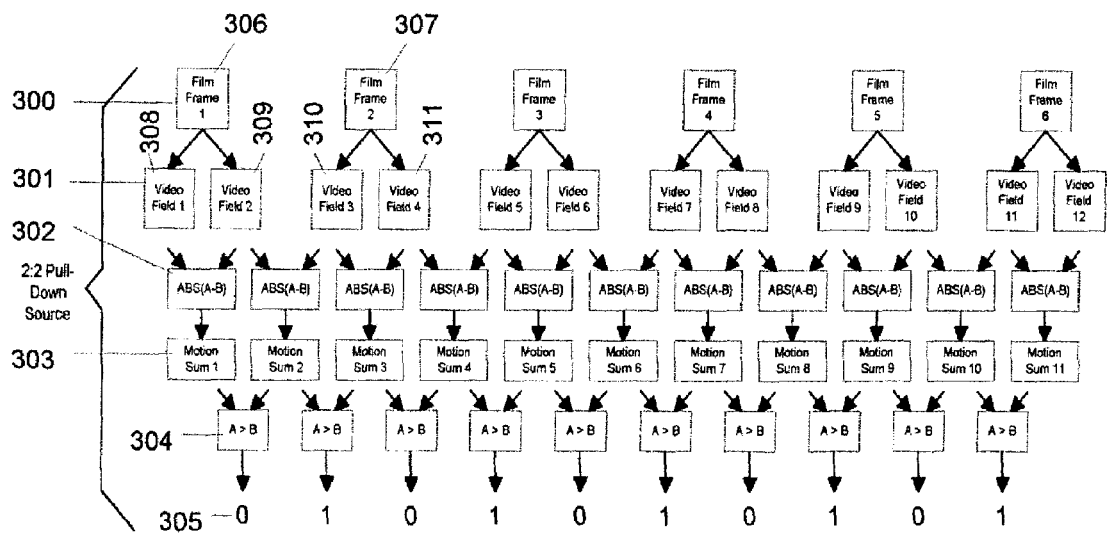
Fig. 3

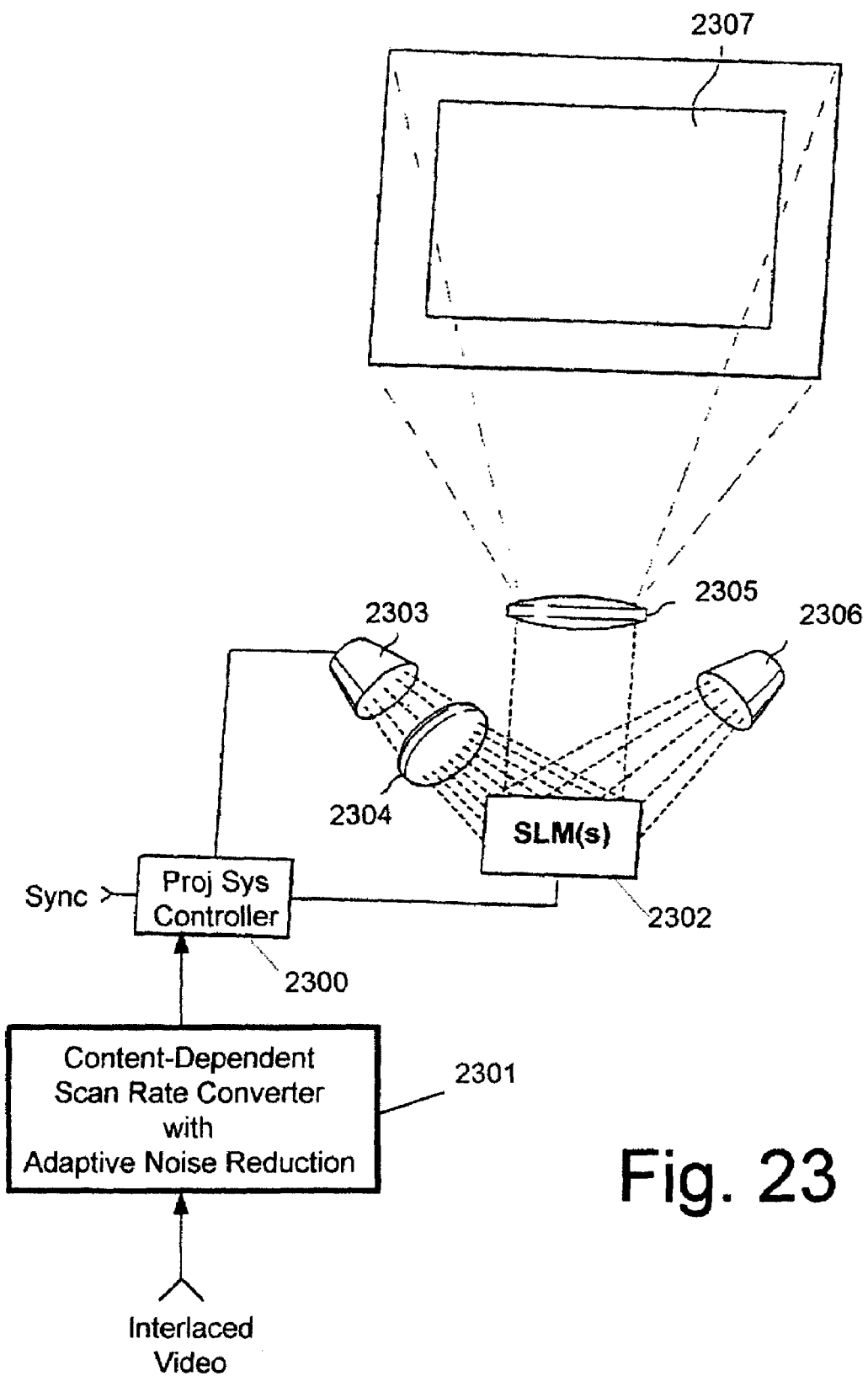

CONTENT-DEPENDENT SCAN RATE CONVERTER WITH ADAPTIVE NOISE REDUCTION

This application claims priority under 35 USC §119(e)(1) of provisional application number 60/345,731 filed Dec. 31, 2001.

FIELD OF THE INVENTION

The present invention relates to scan rate conversion and particularly to converting interlace video to progressive video based on the data content.

BACKGROUND OF THE INVENTION

Many spatial light modulators (SLMs), such as the digital micro-mirror device (DMD™) are inherently progressive display devices. Therefore, systems built around these devices require scan-rate conversion of their interlaced video signals in order to double the vertical resolution of each image field. FIG. 1a illustrates an interlaced frame 100, which consists of two fields, field A 101 (dotted line) and field B 102 (solid line). For example, in an NTSC signal these field are approximately 16.7 mSec apart in time with the lines from field A 101 being presented on the TV screen and then the lines from field B 102 being inserted between the field A lines, so that two 60 Hz fields are combined to provide a 30 Hz interlaced frame rate. However, in a progressive display system 150, every line 151 is displayed in every field 150, as shown in FIG. 1b, thereby doubling the vertical resolution of the display.

To produce the sharpest image, these scan rate converters need to be content dependent. In other words, the scan rate converter must analyze the motion patterns of an interlaced image sequence and determine the most suitable method for scan rate conversion, on a pixel-by-pixel basis.

If the interlaced image sequence is created from a progressive source, such as film, having been broken apart into two fields for television presentation, then the scan rate converter can combine adjacent interlaced fields to form the original progressive frame. By performing this film mode detection and correctly jamming adjacent fields, the highest amount of detail is produced in the resulting image.

However, when the original source is an inherently interlaced signal, then the scan rate converter must determine how best to combine information from the current interlaced field and the previous interlaced field. In the absence of motion, the current field and the previous field may be jammed together to form a progressive image with the highest amount of detail. But, if motion is detected, information from the previous interlaced field cannot be used. A moving object is not in the same spatial location in 2 adjacent fields. Therefore, a field jam would produce a progressive image with 2 copies of the moving object. Hence, pixel values must be interpolated from the current field when motion is detected. In order to minimize the loss of vertical detail in moving objects, the scan rate converter must perform interpolation along edges.

In addition, noise on the video must be considered in the scan conversion process since it can give a false indication of motion and can also blur the high spatial detail of the image.

In general, in conventional de-interlacing techniques, the vertical resolution of the new progressive image is accomplished by jamming the odd and even field lines, but only when there is no motion. When there is motion, then only the current field is used and the lines above and below the current pixel are averaged.

What is needed is a highly integrated scan rate converter that determines, on a pixel-by-pixel basis, if motion is present in the image and then determines the best value for each pixel for a high resolution progressive image. This method needs to interpolate along edges, rather than across them. This solution further needs to include adaptive noise reduction, also on a pixel-by-pixel basis, to prevent false motion detection and assure high spatial detail in the image. The features incorporated in the method and implementation of the present invention meets these needs.

SUMMARY OF THE INVENTION

The content-dependent scan rate converter with adaptive noise reduction of the present invention is a highly integrated, implementation efficient, de-interlacer. By identifying and using redundant information (motion values and edge directions), this scan rate converter is able to perform the tasks of film-mode detection, motion-adaptive scan rate conversion, and content-dependent video noise reduction, while minimizing the amount of logic needed to perform these tasks.

If the interlaced image sequence is created from a progressive source, such as film, then the progressive frame is created by jamming the appropriate adjacent fields together. Both 3:2 (60 Hz) film mode detection (NTSC) and 2:2 (50 Hz) film mode detection (PAL) are addressed in the method of the present invention. Additionally, when the film source is lost, the method smoothly switches from film mode (field jam) to motion-adaptive scan rate conversion.

However, when the original source is an inherently interlaced signal, then the motion-adaptive scan rate converter must determine how best to combine information from the current interlaced field and the previous interlaced field. The motion-adaptive scan rate conversion process employs an edge-adaptive interpolation technique. In the presence of motion, pixels are interpolated using only the current field. By interpolating along an edge, high vertical detail can be maintained. In the absence of motion, the present field is jammed with the previous field. To prevent false motion detection, the scan rate converter uses a temporal maximum motion filter. Since simple, frame-based motion detection fails when moving objects change direction or move quickly, a temporal maximum motion filter is used to provide a memory of previous locations of moving objects.

This scan rate converter is highly noise robust with the motion values being filtered for the two most common video noise distributions, impulsive noise and Gaussian noise. The video data is also passed through an adaptive noise reduction filter. This adaptive video noise reduction is incorporated in the process so that temporal noise reduction is performed on the still parts of the image, thus preserving high detail spatial information and data adaptive spatial noise reduction is performed on the moving parts of the image. A low-pass filter is used in flat fields to smooth out Gaussian noise, and a direction-dependent median filter is used in the presence of impulsive noise or an edge. Therefore, the selected spatial filter is optimized for the particular pixel that is being processed to maintain crisp edges.

Finally, a highly efficient up-converter, used in the process to provide a progressive video output, requires only 1½ lines of memory, a vast improvement over the normal 4 line memory required to perform this task in conventional implementations.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1a and 1b are drawings illustrating interlaced and progressive video, respectively, in conventional displays.

FIG. 3 is a block diagram for the 2:2 PAL (50 Hz) film mode pull-down technique used in the present invention.

FIG. 4 is a state diagram for the state machine used in the 2:2 film mode pull-down technique of the present invention.

FIG. 23 is a block diagram of a SLM based projection display, which uses the content-dependent scan rate converter with adaptive noise reduction to convert interlaced video to progressive video.

DETAILED DESCRIPTION OF THE PREFERRED EMBODIMENT

Figure 2:
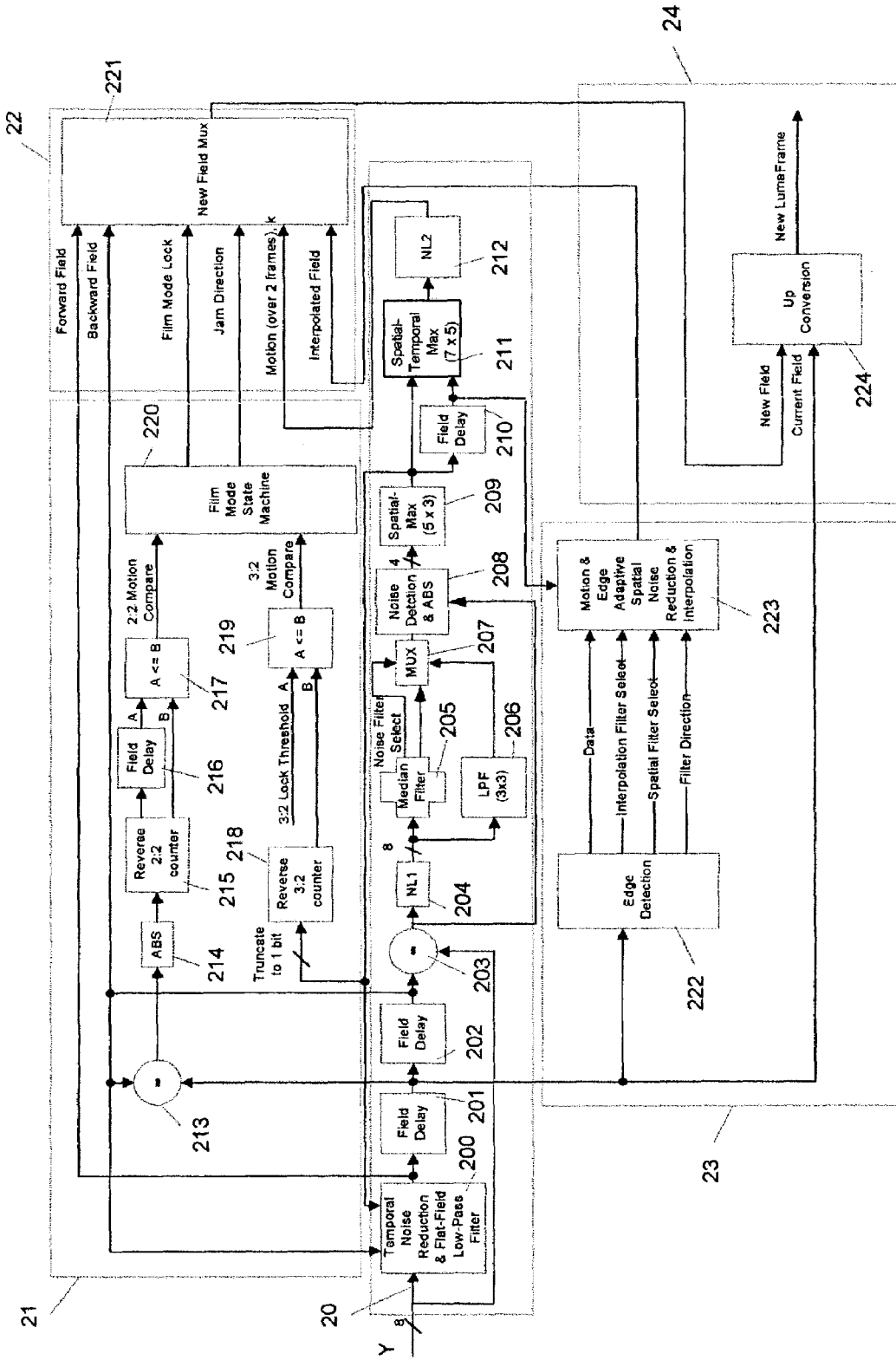
FIG. 2 is a block diagram for the luminance portion of the content-dependent scan rate converter with adaptive noise reduction of the present invention, including a motion path, edge detection path, 2:2 film mode pull-down path, 3:2 film mode pull-down path, progressive field generation, and embedded noise detection and reduction functions.

The content-dependent scan rate converter with adaptive noise reduction of the present invention identifies and uses redundant information (motion values and edge directions) to perform the tasks of film-mode detection, motion-adaptive scan rate conversion, and content-dependent video noise reduction.

If the interlaced image sequence is created from a progressive source, such as film, then the progressive frame is created by jamming the appropriate adjacent fields together. Both 3:2 (60 Hz) film mode detection (NTSC) and 2:2 (50 Hz) film mode detection (PAL) are addressed in the method of the present invention. Additionally, when the film source is lost, the method smoothly switches from film mode (field jam) to motion-adaptive scan rate conversion.

However, when the original source is an inherently interlaced signal, then the motion-adaptive scan rate converter must determine how best to combine information from the current interlaced field and the previous interlaced field. The motion-adaptive scan rate conversion process employs an edge-adaptive interpolation technique, where in the presence of motion, pixels are interpolated from the current field. By interpolating along an edge, high vertical detail can be maintained. In the absence of motion, the present field is jammed with the previous field. To prevent false motion detection, the scan rate converter uses a temporal maximum motion filter. In addition, since simple, frame-based motion detection fails when moving objects change direction or move quickly, a temporal maximum motion filter is also used to provide a memory of previous locations of moving objects.

This scan rate converter is highly noise robust with the motion and data values being filtered for the two most common video noise distributions, impulsive noise and Gaussian noise. The motion and edge information used by the scan rate converter is also used in the video noise reduction function. In the absence of motion, temporal redundancy can be exploited, and a temporal filter can be used for noise mitigation. When motion is detected, there is no temporal correlation, so a spatial filter must be used for noise mitigation. Edge information determines the best-suited spatial filter. A median filter should be used in the presence of an edge, and a low-pass filter should be used in flat fields. The motion values must be processed to prevent inadequate motion detection and false motion detection. To prevent false motion detection, motion values must be robust to noise. In other words, the motion image for an interlaced field must be filtered. To prevent inadequate motion detection, the motion image must be spatially and temporally dilated. This prevents lack of motion detection in objects that have changed direction and improves motion coverage of fast moving objects.

Moreover, motion noise reduction is performed on signed framed difference data at full 8-bit resolution. Hence, motion noise, characterized by high frequency polarity changes, can be easily filtered from meaningful motion values, characterized by a flat field of a single polarity. A median filter is used in the presence of a motion edge or impulsive noise. Otherwise, a low-pass filter is employed. Video data is also filtered with an adaptive noise reduction technique. Temporal noise reduction is performed on the still parts of the image, thus preserving high detail spatial information, and data adaptive spatial noise reduction is performed on the moving parts of the image. A low-pass filter is used in flat fields to smooth out Gaussian noise, and a direction-dependent median filter is used in the presence of impulsive noise or an edge. Therefore, the selected spatial filter is optimized for the particular pixel that is being processed to maintain crisp edges.

Noise robustness is maintained for unprocessed field difference data used for 2:2 (50 Hz) film mode detection, where a state machine compares motion images from adjacent fields, so the noise content is normalized. Additionally, when the film source is lost, the method smoothly switches from film mode (field jam) to motion-adaptive scan rate conversion.

For ease of description, the scan rate converter discussion will be broken down into 2 domains: the luminance (luma) domain and the chrominance (chroma) domain. The luma domain consists of 3 components: (1) a film mode circuit, (2) a motion-adaptive scan rate conversion circuit, and (3) a noise reduction circuit, while the chroma domain consists of 2 components: (1) the noise reduction function, and (2) a live averaging function.

First, a detailed discussion of the luma domain follows:

FIG. 2 is a block diagram for the luma domain portion of the content-dependent scan rate converter with adaptive noise reduction, which includes a motion path 20, 2:2 and 3:2 film mode pull-down functions 21, a new field function 22, an edge detection path 23, an up-converter function 24, and embedded noise detection and reduction.

Along the motion path 20, interlaced video is applied to an input of a temporal noise reduction and flat-field low-pass filter block 200 and to one input of a difference amplifier 203. The filtered video output from this noise reduction and low-pass filter block 200 is then delayed by a first field delay buffer 201 and a serial second field buffer 202 and fed into a second input of the difference amplifier 203. The output of difference amplifier 203 represents the motion image (signal) since it is taken as the difference between the present and previous odd or even fields. The field data are 8-bits each and the difference (motion signal) is 9-bits; i.e., an 8-bit value and 1-bit sign. The motion signal is then filtered by a non-linear coring filter 204, which removes low-level variations (noise) in the motion signal. The output of the non-linear filter 204 is then coupled in parallel to the input of a 5-tap median filter 205 and a 3×3 low-pass filter 206. The median filter 205 is used to reduce impulse noise and the low-pass filter 206 is used to remove Gaussian noise from the signal. In addition, the median filter 205 generates a noise filter select signal. The outputs from the median filter 205 and low-pass filter 206, along with the noise select signal, are coupled to inputs of a multiplexer 207. On a pixel-by-pixel basis, the multiplexer 207 selects either the median filtered signal or the low-pass filtered signal, depending on the state of the noise filter select signal for the particular pixel.

The 8-bit filtered motion signal results from multiplexer 207 are then compared to the raw frame difference values from difference amplifier 203 by the noise detection function 208. The absolute value of this difference gives the amount of motion noise for a given pixel and is used to establish a 4-bit noise level floor for a given field. The signal from the noise function block 208 is then passed through a 5-pixel by 3-line (5×3) spatial maximum filter 209 to dilate the motion image and thus improve spatial motion coverage. The signal from the spatial maximum filter 209 is delayed by one field and both the signal and delayed signals are processed by a 7-pixel by 5-line (7×5) spatial-temporal maximum filter 211 to prevent inadequate motion detection in the scan converter. Finally, a second noise coring function 212 is applied to the motion intensity values to get rid of low level system noise. The output of the motion circuitry is then coupled to an input of the new field multiplexer 221.

The 2:2 and 3:2 film mode pull-down functions 21 of FIG. 2 will now be discussed. First the 2:2 film mode detection, where the difference between adjacent luma fields is determined by difference amplifier 213. The absolute value 214 of this difference is taken as motion images. These motion images are then passed through a reverse 2:2 counter 215, which sums all the motion intensity values of a single motion image. The current motion sum is passed through a one-field delay 216. The current motion sum is then compared to the previous quantized motion sum by the $A \leq B$ comparator 217. If the motion sums periodically toggle between large and small values (0, 1, 0, 1, 0, 1), then a 2:2 pull-down source is detected. The output from this path is then coupled into an input of a film mode state machine 220.

The 3:2 film mode detection takes the 5×3 spatial maximum filtered signal and passes it through a 3:2 reverse counter 218 and then compares the output of this circuit with a pre-defined 3:2 lock threshold value in $A \leq B$ comparator 219. If the output of the comparator produces a periodic pattern of the form 0, 1, 1, 1, 1, 0, 1, 1, 1, 1, 0, then a 3:2 pull-down source is detected. The output from this path is also coupled into an input of the film mode state machine 220.

The outputs from the film mode state machine are then coupled into two additional inputs of the new field multiplexer 221.

The edge detection path 23 consists of the edge detection function 222, motion and edge adaptive spatial noise reduction, and interpolation function 223. The edge detection function 222 supplies a number of signals to the motion & edge adaptive spatial noise reduction and interpolation circuit 223, including data, an interpolation filter select signal, a spatial filter select signal, and a filter direction signal. Edge information is calculated in parallel with the motion intensity values. The orientation of an edge is determined by observing the results of several luminance subtractions. The edge detection circuit 222 takes the difference between pixels in a 3×3 matrix, and if all of these differences lie below a certain pre-defined threshold, then it is assumed that an edge is not present, and a two-dimensional low-pass filter will be used. However, if an edge is detected, a direction dependent 5-tap median filter will be used. Even though median filters are not as effective as linear filters for removing white noise, they do have the advantageous characteristic of maintaining crisp edges. Moreover, median filters are more effective than linear filters when it comes to removing impulsive noise. The output of the motion edge adaptive spatial noise reduction block 223 is also coupled to an input of the new field multiplexer 221. The edge detection circuitry will automatically transfer control to the median filter in the presence of impulsive noise. Therefore, the noise reduction filter is switched to the most optimal filter type.

Finally, the up-converter function 24 has a first input representing the current field and a second input coming from the new field multiplexer 221. The output of the up-converter function 224 provides the new progressive luma frame with optimal data processing on a pixel-by-pixel basis.

As mentioned earlier, there are two types of film sources that the system will detect, a 2:2 pull-down source and a 3:2 pull-down source. The term pull-down refers to the number of fields (or interlaced images) created from 2 film frames. Film is captured at 24 frames per second (24 Hz), so the 2:2 pull-down technique is used to create a 50 Hz video signal such as PAL (4 fields/2 frames*24 frames/s~50 Hz). The 3:2 pull-down technique is used to create a 60 Hz video signal such as NTSC (5 fields/2 frames*24 frames/s=60 Hz).

The 2:2 and 3:2 pull-down state machines are enabled/disabled by a 60 hz mode control signal. This signal is provided by external front-end electronics, which can detect the source vertical sync rate. The 2:2 pull-down state machine is enabled only for 50 Hz sources and the 3:2 pull-down state machine only for 60 Hz sources.

FIG. 3 is a block diagram for the 2:2 PAL film mode pull-down technique used in the present invention. A 2:2 pull-down source is detected by observing luma field differences. In the figure, video frames are shown along line 300, video fields along line 301, and the absolute difference between adjacent video fields along line 302. For example, video fields 1 308 and 2 309 make up film frame 1 306, video fields 3 310 and 4 311 make up film frame 2 307, and so on along line 300. The absolute value of the difference between adjacent luma fields creates the motion images ABS (A−B) on line 302. Motion sums 303 are then found by summing all the motion intensity values of a single motion image and quantizing this value to 20-bits. This quantized motion sum is then compared to the previous quantized motion sum by the A>B blocks 304. If the motion sums periodically toggle between large and small values (0, 1, 0, 1, 0, 1) 305, then a 2:2 pull-down source is detected. The 2:2 pull-down state machine looks for this periodicity, and if it is found, the state machine decides which field should be jammed with the current field. For instance, if video field 3 310 were the current field, then video field 4 311 would be chosen to fill in the missing lines. Thus, the original progressive frame, film frame 2 307, would be produced.

The state diagram for the state machine used in the 2:2 pull-down detection is shown in FIG. 4. The order of the variables for this 2:2 state machine are:

lock_22:mot_cmp_22:seq_detect_22/lock_22:jam_dir_22:seq_detect_22.

The 2:2 state machine variables are as follows:
lock_22→when a 2:2 source is detected this variable is set to 1 (set to film mode),
mot_cmp_22→when the amount of motion in the current field is greater than the amount of motion in the previous field this variable is set to 1,
seq_det_22→when mot_cmp_22 becomes 1 this variable is set (in other words, the beginning of a 2:2 sequence has been detected), and
jam_dir_22→if set, the current field should be jammed with the next field, otherwise the current field should be jammed with the previous field.

In operation, the 2:2 state machine moves as follows:
The states on the left of the backslash (/) describe the current state of each variable, and the states on the right of the backslash describe how the state machine will move (how each variable will be affected) when an external FSYNC signal is asserted. When the scan rate converter is brought out of reset, the state machine is initialized to state 1:2 400. If mot_cmp_22 becomes one, the state machine moves to state 2:2 401 and seq_det_22 is set. Subsequently, if mot_cmp_22 becomes zero, then a 2:2 sequence has been detected and lock_22 is set and film mode is activated.

The state machine will remain locked to a 2:2 film source if the motion sequence transitions from toggling (0, 1, 0, 1, 0, etc.) to a flat sequence of zeroes (0, 0, 0, 0, 0, etc.). This prevents the unfavorable circumstance of unlocking during still scenes and relocking when motion is present. In other words, the 2:2 pull-down state machine, once locked onto a 2:2 film source, will remained locked until motion is found out of sequence.

Figure 5:
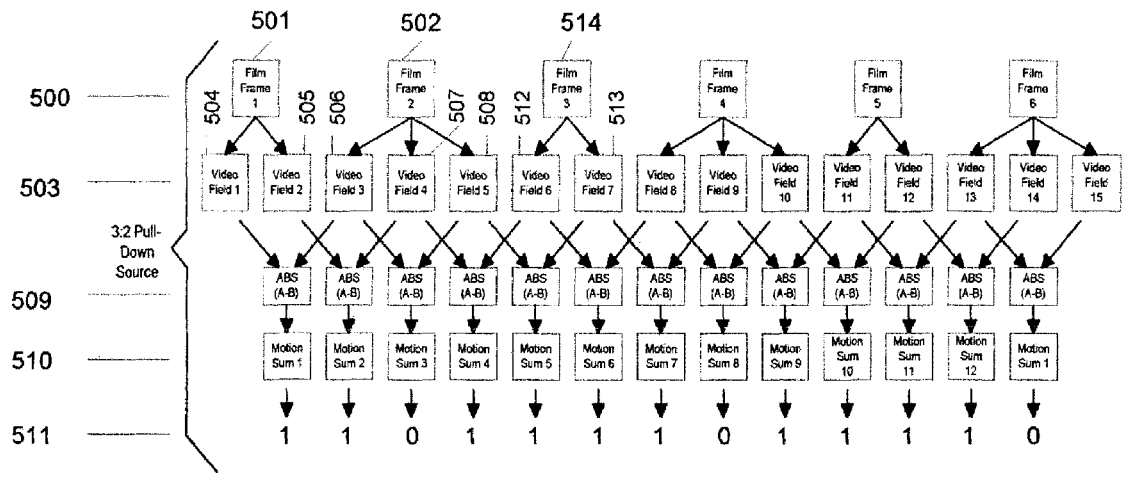
FIG. 5 is a block diagram for the 3:2 NTSC (60 Hz) film mode pull-down technique used in the present invention.

FIG. 5 is a block diagram for the 3:2 NTSC film mode pull-down technique used in the present invention. A 3:2 pull-down source is also detected by observing luma field differences. In the figure, video frames are shown along line 500, video fields along line 503, and the absolute difference between adjacent video fields along line 509. For example, in this case film frame 1 501 consists of video fields 1 504 and 2 505, but film frame 2 502 consists of three video fields 3 506, 4 504, and 5 508, and so on, alternating along line 503. The absolute value of the difference between adjacent odd luma fields and adjacent even luma fields creates the motion images ABS(A−B) along line 509. Motion sums 510 are then found by summing all the motion intensity values of a single motion image and quantizing this value to 20-bits.

By observing the results 511 of these motion sums over time, a 3:2 source can be detected. If the output of an A−B comparator is 1 when the motion sum is greater than the noise threshold and 0 otherwise, a 3:2 source will produce the following periodic pattern: 0, 1, 1, 1, 1, 0, 1, 1, 1, 1, 0, etc. The 3:2 pull-down state machine looks for this periodicity, and if it is found, it decides which field should be jammed with the current field. For instance, if Video Field 7 513 were the current field, then Video Field 6 512 would be chosen to fill in the missing lines. Thus, the original progressive frame, Film Frame 3 514, would be produced.

Figure 6:
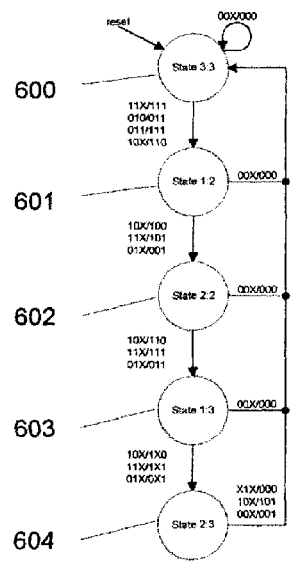
FIG. 6 is a state diagram for the state machine used in the 3:2 film mode pull-down technique of the present invention.

The state machine for 3:2 pull-down detection is shown below in FIG. 6. The order of the variable for the 3:2 state machine are
lock_32:mot_cmp_32:seq_detect_32/lock_32:jam_dir_32:seq$_{13}$dect$_{13}$32.

The 3:2 state machine variables are as follows:
lock_32→when a 3:2 source is detected this variable is set to 1 (set to film mode),
mot_cmp_32→when the amount of motion in the current field is greater than a programmable noise floor (floating zero) this variable is set,
seq_det_32→when mot_cmp_32 follows the 3:2 sequence (1, 1, 1, 1, 0, 1, etc., refer to FIG. 3) this variable is set, and
jam_dir_32 if set, the current field should be jammed with the next field, otherwise the current field should be jammed with the previous field.

In operation, the 3:2 state machine moves as follows:
When the scan rate converter is brought out of reset, the state machine is initialized to state 3:3 600. If mot_cmp_32 becomes one, the state machine moves to state 1:2 601 and seq_det_32 is set. Subsequently, if mot_cmp_22 stays equal to one for 4 more frames than the state machine will move from state 1:2 601, to state 2:2 602, to state 1:3 603, and finally to state 2:3 604. Otherwise, the state machine will move back to state 3:3 600 and seq_det__32 will be cleared to zero. When state 2:3 604 is reached, if mot_cmp__32 becomes zero, then a 3:2 source has been detected and lock__32 will be set to activate film mode.

The 3:2 state machine will also remain locked to a 3:2 film source if the motion sequence transitions from the 3:2 motion pattern to a flat sequence of zeroes (0, 0, 0, 0, 0, etc.). This prevents the unfavorable circumstance of unlocking during still scenes and relocking when motion is present. The 3:2 pull-down state machine, once locked onto a 3:2 film source, will remained locked until motion is found out of sequence.

The lock signals for both the 2:2 and 3:2 pull-down state machines will be counted and compared to a programmable register value to determine how many consecutive locks must be detected before declaring a film mode lock state. This provides hysteresis for transitioning in and out of the lock state, which will prevent jamming errors for a source with multiple consecutive sequence breaks.

Figure 7:
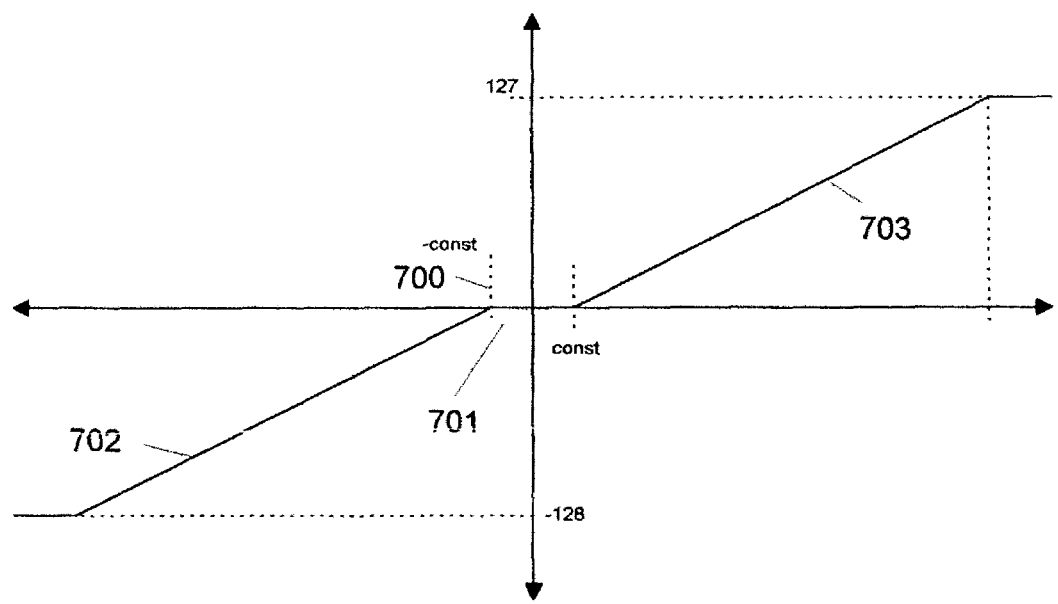
FIG. 7 is a graph showing a first non-linear coring noise filter function used to remove low-level noise in the present invention.

Following along the motion path 20 in the block diagram of FIG. 2, the output of the difference amplifier 203 provides the difference between the current luma field and the luma field form the previous luma frame, thereby creating a motion image. This motion image is passed through the non-linear low-pass filter function 204 to remove low-level noise and quantize the motion intensity values to 8 bits. FIG. 7 shows the characteristics of this nonlinear function. The constant 700 shown is used to control the amount of noise coring 701. The motion values remain signed (negative 702 and positive 703) until after noise reduction is performed on the motion image. Moving objects in the motion image will appear as flat fields of a particular polarity, either positive 703 or negative 702. Noise, however, will produce large variations in polarity, such that noise reduction filters can collapse these large polarity variations to their DC offset value of zero.

Figure 8:
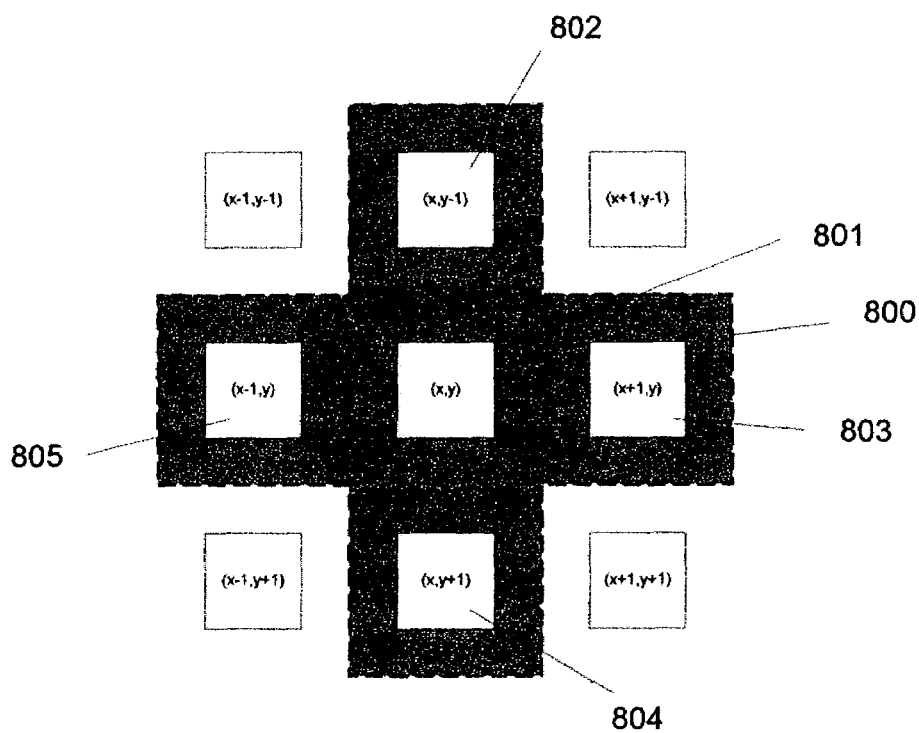
FIG. 8 is drawing identifying the pixels used in the 5-tap median filter for motion noise reduction in the present invention.

To reduce impulsive noise, the motion image is then passed through a 5-tap median filter 205, as described in FIG. 8. The dark gray area 800 shows the span of the filter, which consists of the current pixel (x,y) 801, adjacent horizontal pixels in the current line (x+1,y) 803 and (x−1,y) 805, and adjacent pixels in the previous and next lines (x,y−1) 802 and (x,y+1) 804.

Figure 9:
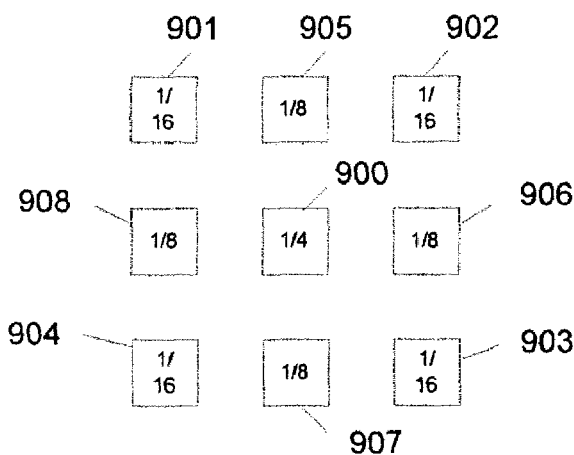
FIG. 9 is a drawing giving the weighting factors for the 3×3 low-pass filter used in the motion noise reduction, the flat-field filter, and the video noise reduction functions of the present invention.

In parallel with the median filter is a 3-pixel by 3-line (3×3) low-pass filter 206, shown in FIG. 9 that is used to remove Gaussian noise. The filter taps have binary coefficients to simplify the implementation to logic circuitry shifts and adds. The coefficients are as follows: current pixel 900→¼, adjacent horizontal pixels 906,908→⅛, adjacent vertical pixels 905,907→⅛, corner pixels 901-903→ 1/16.

In determining the median filter 205 results, the difference between the center tap value (x,y) and the non-center tap values ((x−1,y), (x+1,y), (x,y+1), (x,y−1)) must be calculated. The absolute value of these differences is used to determine which noise reduction filter is more suitable to be selected by the multiplexer 207, the median filter 205 or the low-pass filter 206, for the current pixel (x,y). In the presence of impulse noise or a motion edge, the median filter is more suitable. The low-pass filter is more effective on Gaussian noise. Therefore, when one or more differences lie above a pre-defined threshold, indicating the presence of a motion edge or impulsive noise, the results of the median filter are used. Conversely, when all the differences lie below the pre-defined threshold, the results of the low-pass filter are used.

Figure 10:
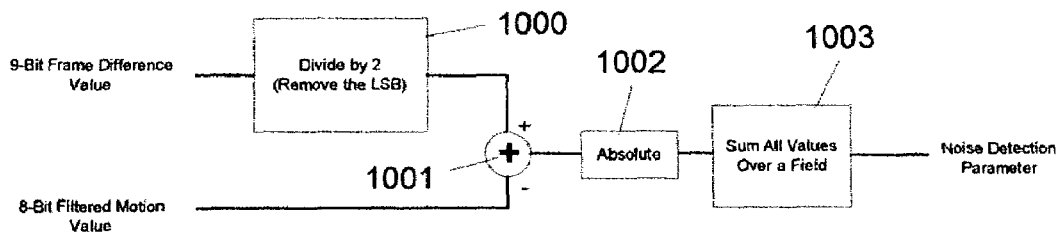
FIG. 10 is a block diagram for the noise detection function of the present invention.

For noise detection, the 8-bit filtered motion results from multiplexer 207 are compared to the raw frame difference values from difference amplifier 203. FIG. 10 is a block diagram for the noise detection circuit 208. The absolute difference between a raw frame difference and its filtered result is equal to the amount of motion noise for a given pixel. The range of the 9-bit raw frame difference is reduced to 8-bits by removing the LSB with divider 1000. The 8-bit filtered motion results are then subtracted with adder 1001. The absolute value 1002 of this result is taken to obtain the magnitude of the difference between the two signals. Finally, the noise floor for an entire field is determined by summing all of these difference magnitudes over the entire field with summing function 1003. This noise detection parameter is used to determine noise reduction parameters for the actual video data. In other words, if the noise detection parameter is high, then the video data will be strongly filtered by the noise reduction circuitry. Conversely, if the noise detection parameter is low, then little to no noise reduction will be performed on the video stream.

Figure 11:
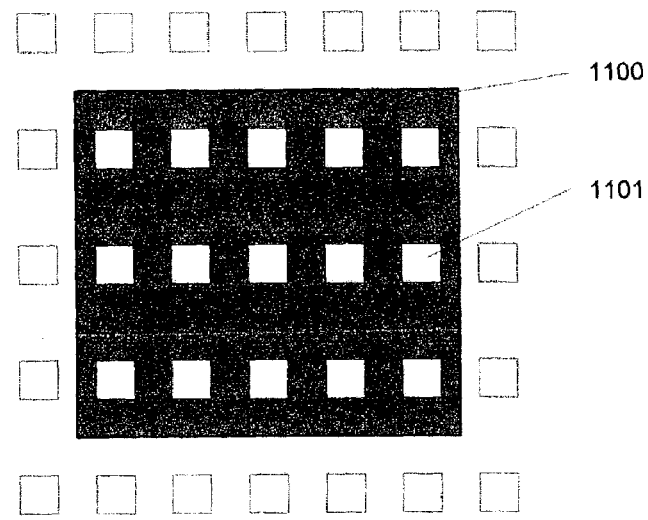
FIG. 11 is a drawing identifying the pixels used in the 5-pixel×3-line (5×3) spatial maximum filter of the present invention.

After the noise detection circuit, the filtered motion values are passed through an absolute value function and limited to 4-bits 208. These 4-bit limited motion values are then passed through a 5 pixels by 3 lines (5×3) spatial maximum filter 209, as shown in FIG. 11 to dilate the motion image and thus improve spatial motion coverage. The span for the 5×3 pixels 1101 of the spatial maximum filter in FIG. 11 is signified by the dark gray area 1100.

Figure 12:
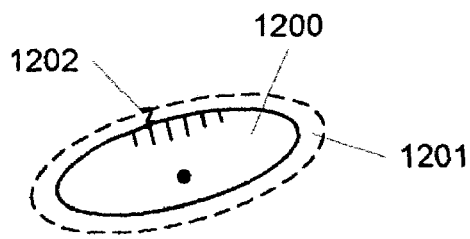
FIG. 12 is a sketch illustrating the dilation effect used in the present invention.

FIG. 12 illustrates the effect of dilating an image where a small area around an object is included with the object to provide more detail in the object. For example, if the lacing 1202 of the football 1200 is loose and extended out from the ball, it will be visible in the dilated area 1201, rather than lost.

The 4-bit dilated motion intensity values are used in temporal noise reduction. The recursive equation for temporal noise reduction is given below.

$$y(T)=k*x(T)+(1-k)*y(T-1),$$

where x(T) is the current pixel, y(T) is the filtered pixel, y(T−1) is the filtered pixel from a frame ago, and k is the recursive constant.

A look-up table (LUT) is used to determine how much temporal noise reduction will be performed for a given level of motion. This LUT maps motion intensity values to the recursive constant, k. As motion increases, k will increase, and the temporal filter will no longer be able to exploit temporal redundancy as the 1−k term gradually decreases. The spatial filter, which will be described later, will gradually turn on with increasing motion, as the temporal filter becomes less effective.

A flat-field low-pass filter 200 is also used on the incoming video. Noise is more perceptible in flat, low-frequency areas of an image. Low-pass filters, moreover, blur high-frequency details Therefore, it is most beneficial to use a low-pass filter in only the flat regions of an image. The absolute difference between the current pixel and its surrounding neighbors is used to determine the presence of a flat-field. If each absolute difference lies below a pre-defined edge threshold, then a flat-field has been detected, and the given pixel will be filtered with a 3 pixels by 3 lines low-pass filter, as specified and discussed earlier in FIG. 9.

Figure 13:
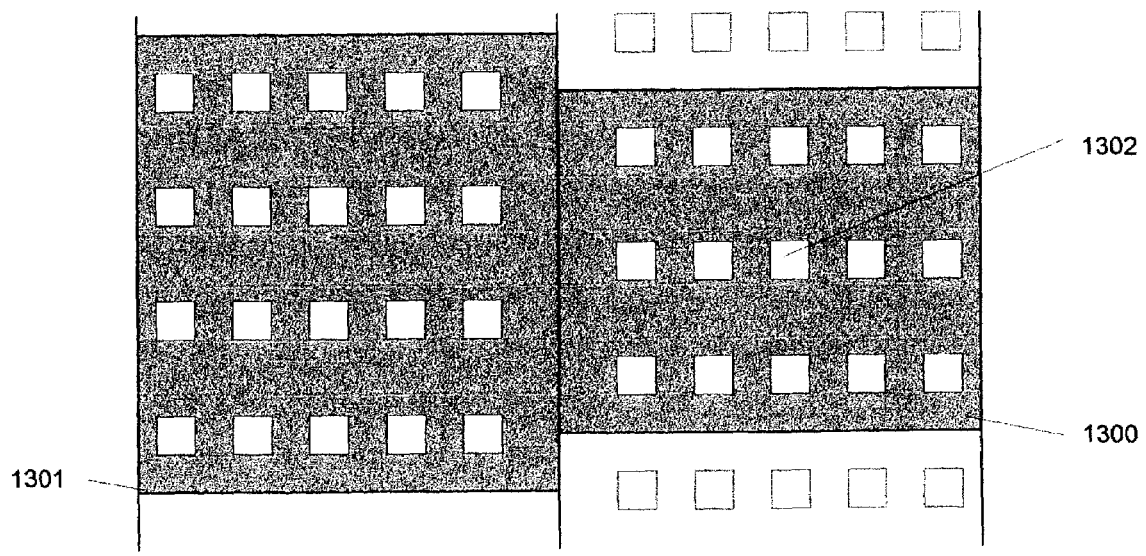
FIG. 13 is a drawing showing 5-pixels by 4-lines of the previous field and 5-pixels by 3-lines of the present field, which are combined to provide the 5-pixel by 7-line (5×7) spatial-temporal maximum filter function of the present invention.

When the original source of video is an inherently interlaced signal, motion-adaptive scan rate conversion is used. In this case, motion intensity values are processed for noise robustness and complete spatial-temporal coverage of moving objects. The motion noise reduction techniques described previously are employed in the motion-adaptive scan rate conversion method. The 4-bit output of the spatial maximum filter 209, along with a one-field delay of the signal, are further processed to improve motion coverage. A 5-pixel by 7-line (5×7) spatial-temporal maximum filter, shown in the FIG. 13 is used to prevent inadequate motion detection. The shaded area 1300 defines the span of the filter for the current field's motion values and the shaded area 1301 defines the span of the filter for the previous field's motion values, where the current pixel 1302 is located at the center of the current field. The results of the spatial maximum filter 209 are used in both 3:2 source detection and motion-adaptive scan rate conversion. For 3:2 source detection, the motion values are quantized to a single bit.

Figure 14:
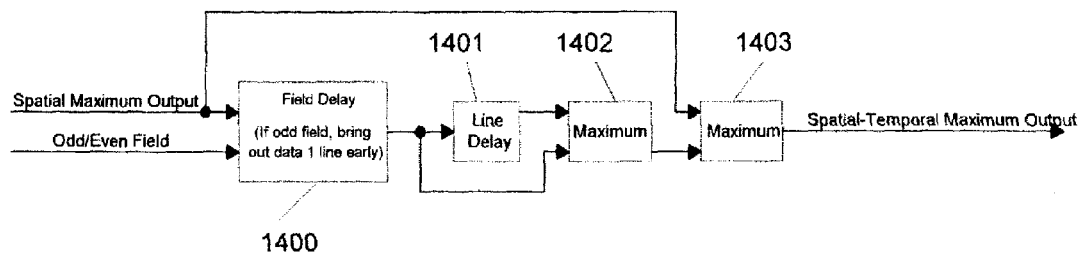
FIG. 14 is a block diagram for the spatial-temporal maximum filter function of the present invention.

The block diagram of FIG. 14 is used to implement the 7×5 spatial-temporal filter of FIG. 13. Here, the output from the 5×3 spatial maximum filter 209 is delayed by another field 1400 and then delayed by a line 1401. Then, the maximum 1402 is taken between this delayed field output 1400 and delayed line output 1401. Finally, the resulting maximum 1402 is compared to the spatial maximum output 209 and a new maximum 1403 is taken as the spatial-temporal maximum output.

Figure 15:
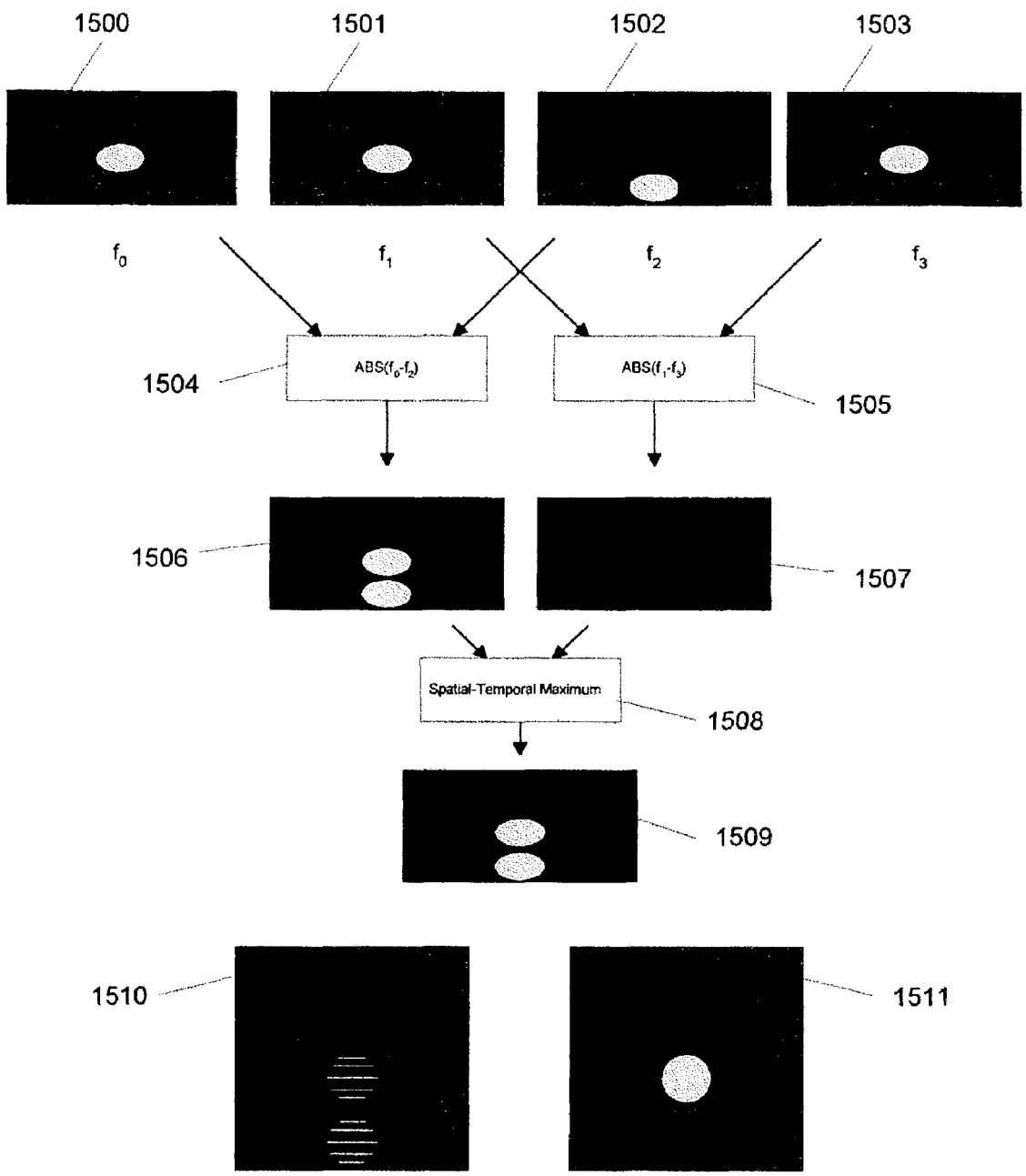
FIG. 15 is a first example of the motion coverage provided by the present invention, illustrating the difference between jammed video fields and interpolated video.

A first example showing the result of adequate and inadequate motion coverage is shown in FIG. 15. This shows four video fields $f_0$ 1500, $f_1$ 1501, $f_2$ 1502, and $f_3$ 1503 where there is motion in a ball in field $f_2$ 1502. Absolute frame differences 1504 and 1505 are taken between fields $f_0$ 1500-$f_2$ 1502 and $f_1$ 1501-$f_3$ 1503, with the results as shown in blocks 1506 and 1507, respectively. Result 1506 indicates the motion of the ball by showing two balls, while result 1507 is blank since there was no motion in this frame. Then the spatial-temporal maximum 1508 between result 1506 and 1507 is used to provide the result shown in 1509. This diagram shows the importance of the spatial-temporal maximum function. Without applying the spatial-temporal maximum function it would not have been obvious that there was motion and the corresponding fields would have been jammed together, resulting in two balls as shown in result 1510. On the other hand, by applying the spatial-temporal maximum function, motion is detected and interpolation is performed on the moving object, resulting in only one ball, as shown in result 1511.

Figure 16:
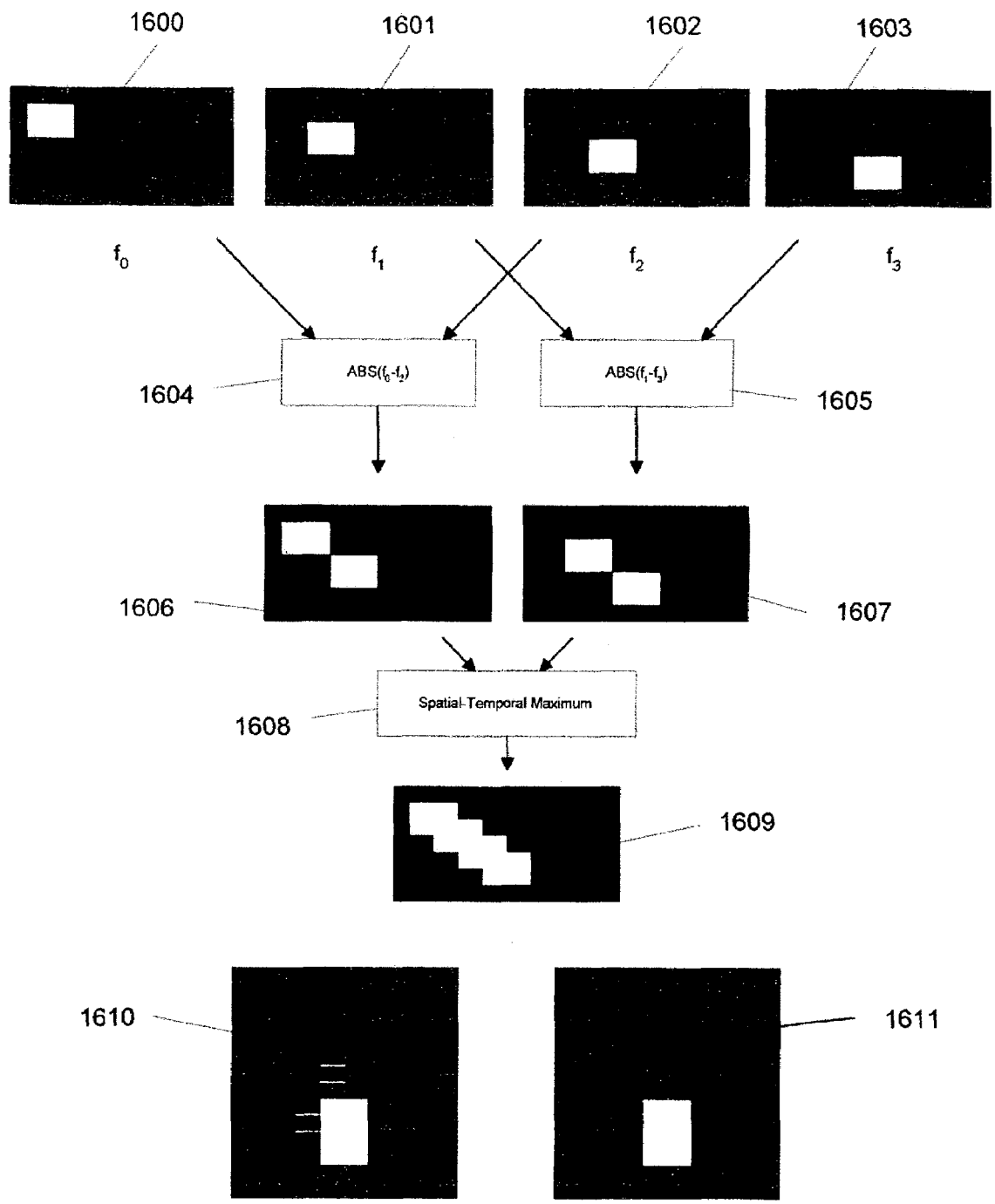
FIG. 16 is a second example of the motion coverage provided by the present invention, illustrating the difference between jammed video fields and interpolated video.

A second example, showing the result of adequate and inadequate motion coverage, is shown in FIG. 16. This shows four video fields $f_0$ 1600, $f_1$ 1601, $f_2$ 1602, and $f_3$ 1603 where the object (box) is moving in every field with overlap between the objects in adjacent fields. Then absolute frame differences 1604, 1605 are taken between fields $f_0$ 1600-$f_2$ 1602 and $f_1$ 1601-$f_3$ 1603, with the results as shown in blocks 1606 and 1607, respectively, indicating the motion and overlap. Then the spatial-temporal maximum 1608 between result 1606 and 1607 provides the result shown in 1609, where the stair step pattern indicates the motion and overlap. Again, without applying the spatial-temporal maximum function, where the motion fields are dilated together, the result 1610 would have appeared in the reconstructed frame, but by applying the spatial-temporal maximum function, interpolation is applied, resulting in the rectangular box shown in result 1611.

Figure 17:
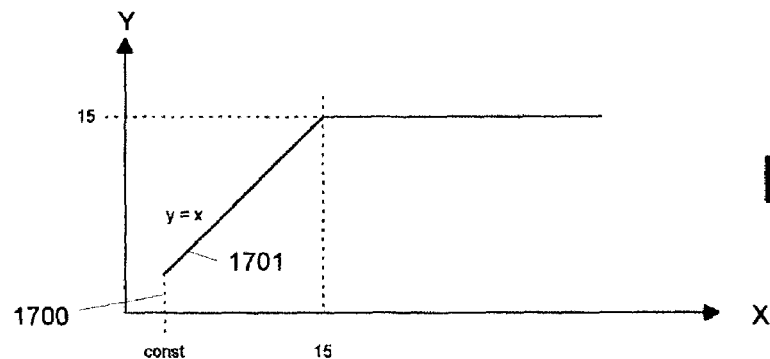
FIG. 17 is a graph showing a second non-linear noise function used to further reduce low-level noise in the present invention.

Finally, a second noise coring function is applied to the motion intensity values using a second non-linear filter 212, as shown in FIG. 17. This filter is used to get rid of low-level noise. If the signal is less than some predefined constant 1700, it is assumed that there is no motion and only noise is present and it is zeroed out. On the other hand, if it is greater than this constant then it is assumed that there is motion involved and the signal 1701 is left alone and supplied to the new field multiplexer 221.

Processing along the motion path discussed above provides a filtered, perfectly clean, dilated, motion image for use in performing motion adapted de-interlacing.

Figure 18:
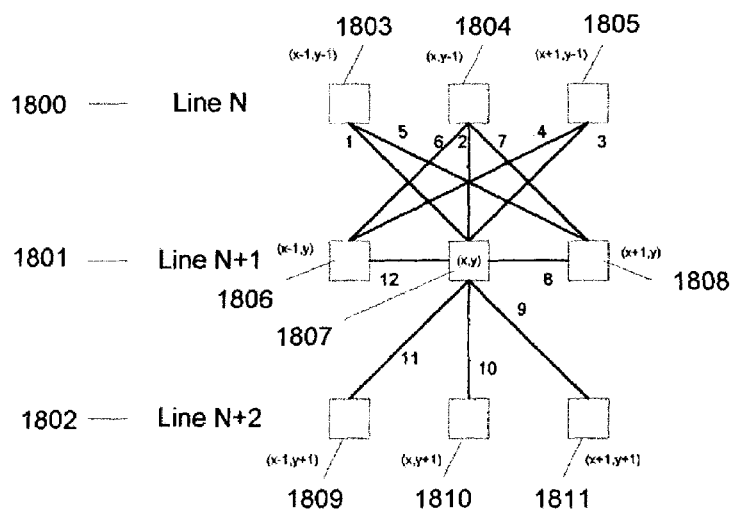
FIG. 18 is a diagram illustrating the radial differences used in determining edge orientation in the present invention.

Edge information is calculated in parallel with the motion intensity values, along the path of block 23 in FIG. 2. The orientation of an edge is determined by observing the results of several luminance subtractions, as shown in FIG. 18. If the difference between two pixels is large, it is assumed that there is an edge between them. Conversely, if the difference between two pixels is small, it is assumed that the two pixels lie on an edge. Two types of edges must be identified: (1) an edge between two lines within a field to be used for interpolation and (2) an edge among three lines within a field to be used for spatial noise reduction; i.e., line N 1800, line N+1 1801, and line N+2 1802. Difference information is shared between these two types of edges. The absolute value of each difference is used for edge detection. FIG. 18 shows all the differences needed to determine the orientation of each edge, where the pixel locations are defined in the following matrix:

| | | |
|---|---|---|
| (x − 1, y − 1) 1803 | (x, y − 1) 1804 | (x + 1, y − 1) 1805 |
| (x − 1, y) 1806 | (x, y) 1807 | (x + 1, y) 1808 |
| (x − 1, y + 1) 1809 | (x, y + 1) 1810 | (x + 1, y + 1) 1811. |

These differences are defined as:

$$1 \rightarrow \{(x, y) - (x-1, y-1)\},$$
$$2 \rightarrow \{(x, y) - (x, y-1)\},$$
$$3 \rightarrow \{(x, y) - (x+1, y-1)\},$$
$$4 \rightarrow \{(x-1, y) - (x+1, y-1)\},$$
$$5 \rightarrow \{(x+1, y) - (x-1, y-1)\},$$
$$6 \rightarrow \{(x-1, y) - (x, y-1)\},$$
$$7 \rightarrow \{(x+1, y) - (x, y-1)\},$$
$$8 \rightarrow \{(x, y) - (x+1, y)\},$$
$$9 \rightarrow \{(x, y) - (x+1, y+1)\},$$
$$10 \rightarrow \{(x, y) - (x, y+1)\},$$
$$11 \rightarrow \{(x, y) - (x-1, y-1)\},$$
$$12 \rightarrow \{(x, y) - (x-1, y)\}.$$

The minimum among differences 1, 2, 3, 4, 5, 6, and 7 is used to determine the location of an edge for interpolation; linear interpolation is performed along an edge to preserve vertical detail. The center of these differences, between 1804 and 1807, is the missing pixel to be interpolated. The average of difference 1 and difference 7 is used to detect a 63-degree edge. Similarly, the average of difference 3 and difference 6 is used to detect a 117-degree edge. Differences 5, 2, and 4 are used to detect 135, 90, and 45-degree edges, respectively. If all of these differences lie below a certain pre-defined edge threshold, then it is assumed that an edge is not present, and interpolation will be done along edge 2. If difference 1, 5, or 7 lie below the edge threshold and difference 3, 4, or 6 also lies below the edge threshold, then correlation is present between opposing directions, and interpolation is performed along edge 2. This particular circumstance occurs with images that have diagonal lines on a solid background. In this case. because there is correlation along the diagonal line and across the diagonal line (through the missing pixel), it is impossible to determine the location of the original line. Therefore, vertical interpolation is performed when the most suitable interpolation direction is indeterminate.

The minimum among differences 1, 2, 3, 8, 9, 10, 11, and 12 is used to determine whether an edge is present for the spatial noise reduction filter. The center of these differences (x,y) 1807 is the pixel to be spatially filtered. If all of these differences lie below a certain pre-defined threshold, then it is assumed that an edge is not present, and a two-dimensional low-pass filter will be used. However, if an edge is detected, a direction dependent 5-tap median filter will be used. Even though median filters are not as effective as linear filters for removing white noise, they do have the advantageous characteristic of maintaining crisp edges. Moreover, median filters are more effective than linear filters when it comes to removing impulsive noise. The edge detection circuitry will automatically transfer control to the median filter in the presence of impulsive noise. Therefore, the noise reduction filter is switched to the most optimal filter type.

Figure 19:
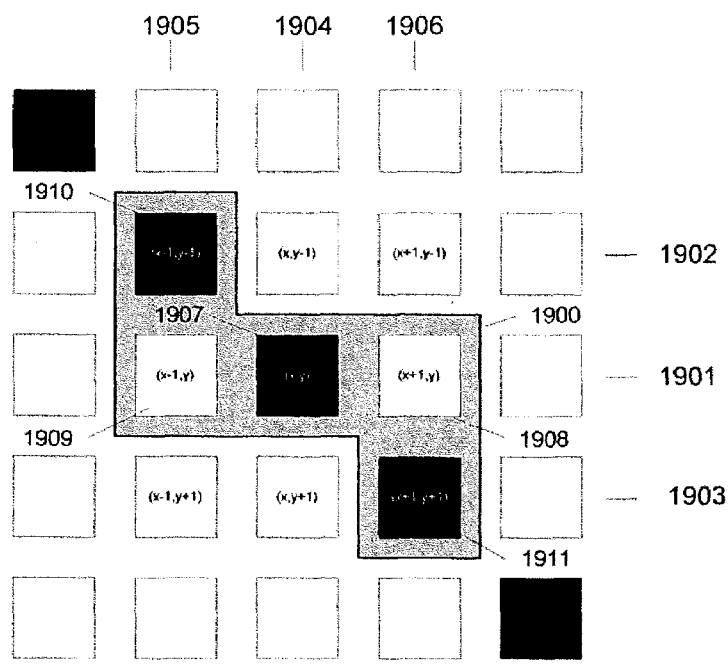
FIG. 19 is drawing identifying the pixels for the direction-dependent median filter used in determining diagonal edges in the present invention.

The location of the taps (shaded area 1900) of the direction dependent median filter, as shown in FIG. 19, is determined by finding the minimum among the upper differences and the minimum among the lower differences from three lines 1901-1903 and three columns 1904-1906. Two taps of the median filter (x–1,y) 1909 and (x+1,y) 1908, respectively, are to the immediate left and the immediate right of the center tap (x,y) 1907. The upper tap of the median filter (x–1,y–1) 1910 is determined by the minimum among differences 1, 2, and 3, and the lower tap (x+1,y+1) 1911 of the median filter is determined by the minimum among differences 9, 10, and 11. For example, if the filter was centered on a 45-degree line moving down from left to right, then difference 1 would be the upper minimum and difference 9 would be the lower minimum, and the span of the median filter would be as shown in FIG. 19.

When an edge is not detected, a 3 pixels by 3 lines (3×3) low-pass filter is used for noise reduction. The filter taps use the same binary coefficients, as described in FIG. 9, to simplify the implementation to logic circuitry shifts and adds.

A linear combination of the temporal noise reduction results and the spatial noise reduction results is determined by examining the amount of motion for the particular pixel being processed. The equation for the linear combination is:

$$y(T)=k*spat\_filt(T)+(1-k)*temp\_filt(T),$$

where y(T) is the final filtered result, spat_filt(T) is the spatially filtered result, temp_filt(T) is the temporally filtered result, and k is the distribution constant.

A look-up-table (LUT) maps motion intensity values to the distribution constant, k. As motion increases, k will increase and 1−k will decrease, thereby shifting the distribution from temporally filtered data to spatially filtered data.

Notice, there are two spatial filters employed in this scan rate converter. One is a flat-field low-pass filter 200 that operates on the incoming field. Its results propagate through the field memories. It is not motion-adaptive. The other is a motion and edge adaptive spatial filter 223 that operates on the field coming out of the first field memory 201 and who's results do not propagate to the subsequent field memory. The latter filter is only used when the scan converter is operating in non-film mode. The former filter, however, operates in both film mode and non-film mode, allowing film sources to be spatially filtered while having minimal impact on the film mode detection circuitry.

Interpolation is performed on the filtered field along edges that are found using the technique described above. A linear combination of the previous field and the newly created interpolated field is calculated based on motion intensity values, according to the equation:

$$z(T)=k*x(T)+(1-k)*y(T-1),$$

where z(T) is the output pixel to be jammed with the current field, x(T) is a pixel from the interpolated field, y(T−1) is a pixel from the previous field, and k is the interpolation constant for the current pixel, Note, k ranges from 0 to 1.

Again, a LUT maps motion intensity values to the interpolation constant, k. When little or no motion is present, pixels from the previous field are jammed with the current field. Conversely, when a significant amount of motion is detected, interpolated pixels are jammed with the current field.

The new field multiplexer 221, shown in FIG. 2, is used to multiplex out the processed luminance data. If a film source is detected, then the correct field, forward or backward, is routed out and subsequently jammed with the current field. On the other hand, if a video source is detected, then the motion adaptive scan rate conversion results are routed out and later combined with the current field.

Next, a discussion of the chroma domain follows:

The human visual system is more acute to luminance variations than to chrominance variations. The algorithm used in the present invention takes this into account, and minimizes the complexity of the chrominance signal processing. There are only 2 major blocks in the chrominance signal-processing path; i.e., (1) noise reduction, and (2) linear interpolation (line averaging).

Figure 20:
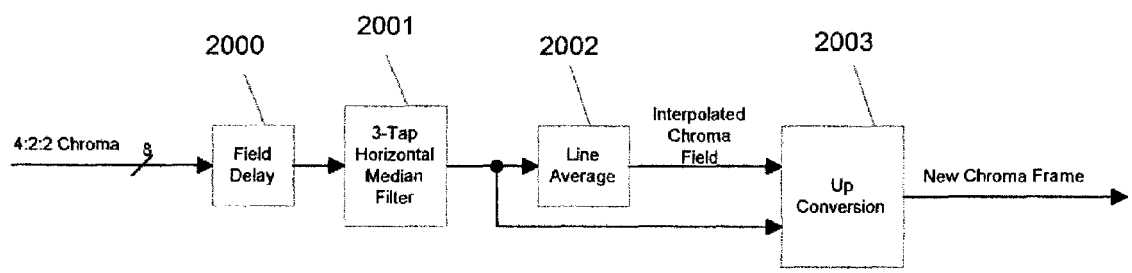
FIG. 20 is a block diagram for the chrominance portion of the content-dependent scan rate converter with adaptive noise reduction of the present invention.

FIG. 20 is a block diagram for the chrominance processing in the scan rate converter of the present invention. In order to minimize the memory and bandwidth requirements, the algorithm requires that the incoming chrominance signal be 4:2:2, as outlined below in Table 2.

TABLE 2

| | 4:2:2 Chroma Input: | | | | | | | |
| --- | --- | --- | --- | --- | --- | --- | --- | --- |
| | | | | Time | | | | |
| Channel | T0 | T1 | T2 | T3 | T4 | T5 | T6 | T7 |
| A | Y0 | Y1 | Y2 | Y3 | Y4 | Y5 | Y6 | Y7 |
| B | Cb0 | Cr0 | Cb2 | Cr2 | Cb4 | Cr4 | Cb6 | Cr6 |

The chrominance signal is first delayed by 1 field memory 2000 to match the latency of the luminance signal-processing path. Then to remove impulsive noise, the chrominance signal is passed through a 3-tap horizontal median filter 2001. After noise reduction, linear interpolation is performed on the chrominance signal by means of line averaging 2002. Both the new interpolated chroma field and the current chroma field are then passed through an up converter 2003.

Figure 21:
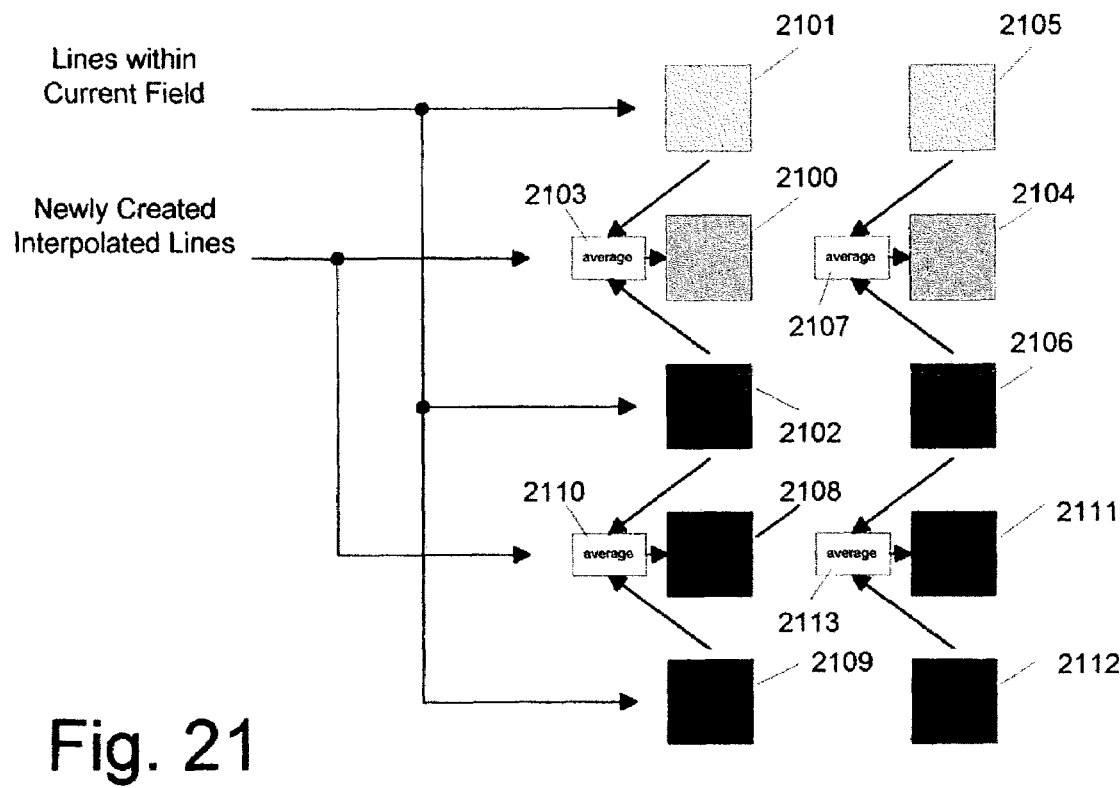
FIG. 21 is a drawing illustrating the chrominance interpolation process used in the present invention.

FIG. 21 illustrates the linear interpolation process used in the chroma interpolation. This process averages lines within the current field to generate the new interpolated chroma lines. For example, pixels 2101 and 2105 from one field line are averaged 2103, 2107 with pixels 2102 and 2106 from the next field line to create the new interpolated chroma pixels 2100 and 2104, respectively. Similarly, pixels 2102 and 2106 from the lower line in the above example are averaged 2110, 2113 with pixels 2109 and 2112 from the next lower field line to create new interpolated chroma pixels 2108 and 2111, respectively.

Now, a discussion of the up-conversion process to provide progressive video follows:

After new luminance and chrominance fields have been created, up conversion must take place to combine the current field with the new field. This is done by the up-converter block 224 in FIG. 2. The current field is made up of pixels from either the odd or even lines of a progressive frame. The newly created field contains pixels from the missing lines of the current field. Ultimately, the up converter 224 orders the odd and even lines of the progressive output and doubles the incoming pixel clock.

For simplicity, the following example uses lines that are only eight pixels wide. The up-conversion process requires one and a half lines of memory. Upper-case characters represent odd line pixels, and lower-case characters represent even line pixels. An odd line pixel is pushed onto a top-line FIFO with the first pixel clock. An even line pixel is pushed onto the bottom-line FIFO with the second clock, Then, another odd line pixel is pushed onto the top-line FIFO with the third pixel clock, and so on. After a system reset, there is a ½ line latency before proscan pixels are ready for output. This allows the top-line FIFO to fill up. Once output begins, it will continue with every pixel clock.

Figure 22A:
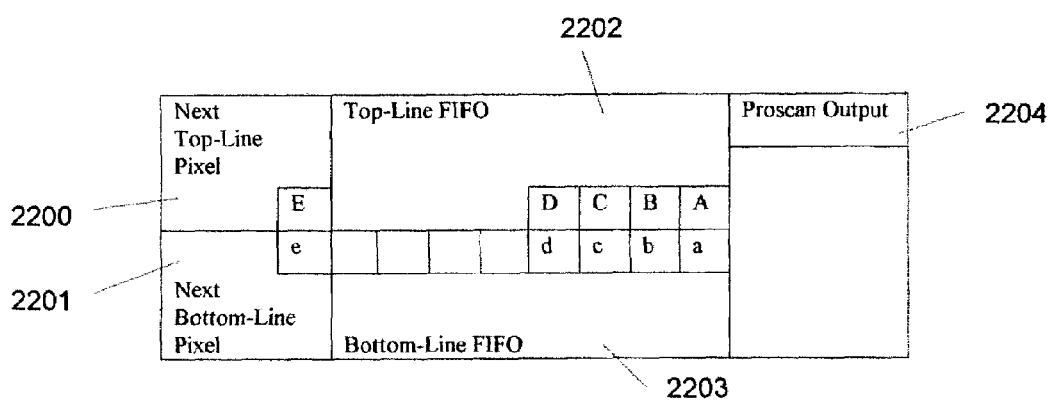
FIG. 22a is a diagram showing the up-converter states for the present invention after the memory lines are reset after 8 pixel clocks are applied.

FIG. 22a is an example showing the up converter FIFO state after being reset followed by 8 pixel clocks. Four top-line pixels have been pushed onto the top-line FIFO 2202, which is now full, and four bottom-line pixels have been pushed onto the bottom-line FIFO 2203, which is now half full. Also shown are the next top-line pixel 2200, the next bottom-line pixel 2201, and the proscan output 2204, which is still empty.

Figure 22B:
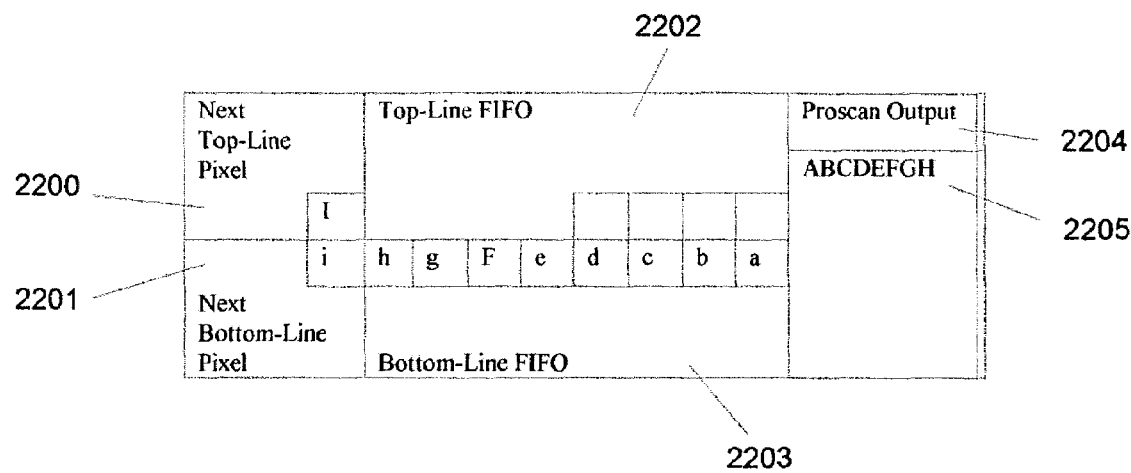
FIG. 22b is a diagram showing the up-converter states for the present invention after an additional 8 pixel clocks are applied.

FIG. 22b shows the next 8 pixel clocks, which causes the top-line FIFO 2202 to pop 8 odd line pixels onto the proscan output 2205 at the full pixel clock rate and loaded from additional bottom-line pixels 2203. The pushing of top and bottom line pixels continues as already described.

Figure 22C:
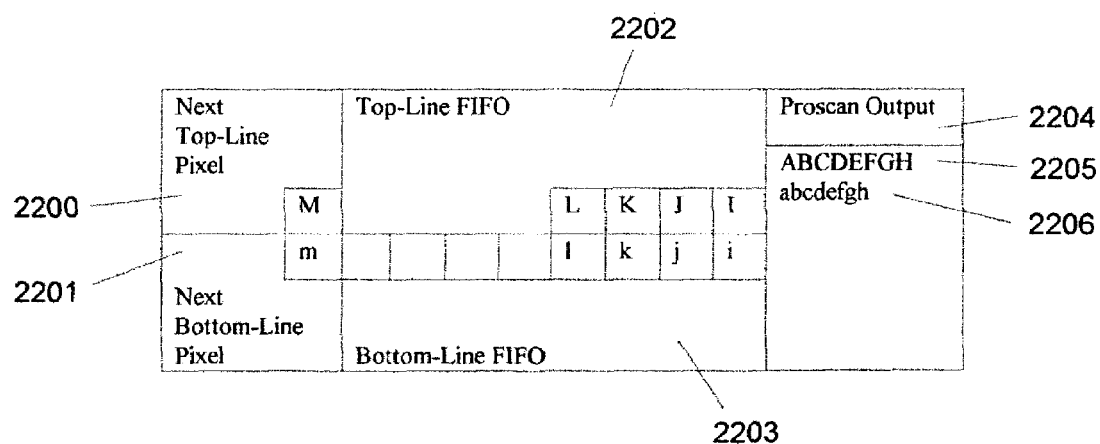
FIG. 22c is a diagram showing the up-converter states for the present invention after an additional 8 pixel clocks are applied.

Finally, the next 8 pixel clocks will cause the bottom-line FIFO to pop pixels on to the output at the full pixel clock rate, as shown in FIG. 22c. The pushing of top and bottom line pixels continues with the process repeating again, popping the top-line FIFO for 8 pixel clocks, as described above, the toggling of top-line and bottom-line pixels continuing until the system is reset.

Table 3 is the pseudo code describing the up converter algorithm from a software point of view.

TABLE 3

```
N = Line Width      # The width of a single line (even positive integer)
Top_Data            # A 1/2 data rate stream for the top line
Bottom_Data         # A 1/2 data rate stream for the bottom line
Progressive_Data    # A full data rate output of progressive data.
Top_FIFO : FIFO ( 1 to N/2 )    # A FIFO to buffer 1/2 top line data
Bottom_FIFO : FIFO ( 1 to N )   # A FIFO to buffer bottom line data
# After a reset, the Top_FIFO needs to be filled with 1/2 top line.
System_Start {
    Loop from 1 to N/2 {
        Push (Top_FIFO , Top_Data)
        Push (Bottom_FIFO , Bottom_Data) } }
# At this point, Top_FIFO is full. It contains 1/2 of the top line.
# Bottom_FIFO is 1/2 full. It contains 1/2 of the bottom line.
NEXT = TOP
Display_Top_Line {
    Loop from 1 to N {
        Progressive_Data = shift (Top_FIFO)
        if ( NEXT = TOP ) {
            Push (Top_FIFO, Top_Data)
            NEXT = BOTTOM }
```

TABLE 3-continued

```
        else {
            Push (Bottom_FIFO, Bottom_Data)
            NEXT = TOP } } }
# At this point, Top_FIFO is empty.
# Bottom_FIFO is full. It contains all of the bottom line.
Display_Bottom_Line {
    Loop from 1 to N {
        Progressive_Data = shift (Bottom_FIFO)
        if ( NEXT = TOP ) {
            Push (Top_FIFO, Top_Data)
            NEXT = BOTTOM }
        else {
            Push (Bottom_FIFO, Bottom_Data)
            NEXT = TOP } } }
# At this point, Top_FIFO is full again. It contains 1/2 of the top line.
# Bottom_FIFO is 1/2 full again. It contains 1/2 of the bottom line.
Go To Display_Top_Line.
```

FIG. 23 is a block diagram for a SLM projection system, which incorporates the content-dependent scan rate converter with adaptive noise reduction of the present invention. The system is comprised of a light source (lamp and collector) 2303, which directs light through color separating and condensing optics 2304 on to the surface of the SLM(s) 2302 (one to three devices). The light source 2303 and the SLM(s) 2302 are controlled by a system controller 2300 to properly modulate the color light focused on the surface of the SLM(s). The controller 2300 receives an input from the content-dependent scan rate converter with adaptive noise reduction circuitry 2301. For those SLM pixels that are turned ON, modulated light is reflected off their surface through projection optics (lens) 2305, on to a viewing screen 2307. For those SLM pixels that are turned OFF, as well as light from other flat surfaces within the package, light is reflected into a dark trap 2306 and disregarded.

In operation, the content-dependent scan rate converter with adaptive noise reduction circuitry converts interlaced video into progressive video to be compatible with these SLM projection system requirements and thereby doubling the vertical resolution of the system. By identifying and using redundant information (motion values and edge directions), this scan rate converter is able to perform the tasks of film-mode detection, motion-adaptive scan rate conversion, and content dependent video noise reduction, while minimizing the amount of logic needed to perform these tasks.

This projection system, using the motion-adaptive scan rate conversion process employs an edge-adaptive interpolation technique. In the presence of motion, pixels are interpolated from the current field. By interpolating along an edge, high vertical detail can be maintained. Adaptive video noise reduction is incorporated into the scan rate converter system. Temporal noise reduction is performed on the still parts of the image, thus preserving high detail spatial information and data adaptive spatial noise reduction is performed on the moving parts of the image. A low-pass filter is used in flat fields to smooth out Gaussian noise, and a direction-dependent median filter is used in the presence of impulsive noise or an edge. Therefore, the selected spatial filter is optimized for the particular pixel that is being processed to maintain crisp edges. This system produces a superior-quality picture on the viewing screen.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A method for video content-dependent scan rate conversion with adaptive noise reduction, comprising the steps of:

for the luminance signal of a source interlaced image:
temporal filtering said interlaced image to mitigate the possibility of false motion detection;
analyzing the motion patterns of said interlaced image to determine if said interlaced image originated from a 2:2 or 3:2 progressive film mode source or from an inherently interlaced source;
based on said analyzing the motion patterns, determine a solution for scan rate conversion on a pixel-by-pixel basis;
determining motion intensity values for said interlaced image;
detecting edge directions in said interlaced image;
using said motion values and edge directions to perform motion-adaptive scan rate conversion on a pixel-by-pixel basis for said interlaced image;
in parallel with said motion-adaptive scan rate conversion, using said motion values and edge directions to perform content-dependent video noise reduction of said interlaced image;
assembling a new content-dependent progressive scan luminance image depending on the presence of motion in said interlaced image, wherein:
adjacent odd and even fields of said interlaced image are combined in the still portions of said interlaced image where motion is not present, said still portions of image being temporally filtered to smooth out Gaussian noise;
interpolating along edges of present field of said interlaced image in the portions of said interlaced image where motion is present, said motion portions of interlaced image being spatially filtered using a direction-dependent median filter in the presence of impulse noise or an edge;

for the chrominance signal of said source interlaced image:
performing spatial filtering using a median filter to remove impulse noise;
performing a linear interpolation on said chrominance signal by averaging adjacent lines in the current field of said interlaced image; and
performing an up conversion to combine the new luminance and chrominance fields with the current field to provide a progressive image.

2. The method of claim 1, wherein if said video originated from a 2:2 or 3:2 film mode source, adjacent interlaced fields are combined to form the original progressive video frame.

3. The method of claim 2, wherein said analyzing the motion patterns further comprises the steps of:
summing all the motion intensity values of a single motion image and quantizing this value to 20-bits to provide a motion sum;
taking the absolute value of the difference between two adjacent luminance fields of said motion image;
comparing said quantized motion sum to the previous quantized motion sum;
if said motion sums periodically toggle between large and small values, with a data pattern of 0, 1, 0, 1, a 2:2 pull-down source is detected indicating a 50 Hz PAL format.

4. The method of claim 2, wherein said analyzing the motion patterns further comprises the steps of:
quantizing said motion values to a single bit;
comparing the sum of all said quantized motion values for a motion image to a noise threshold;
if the output of the comparator is a binary 1 when the motion sum is greater than the said noise threshold and a binary 0 otherwise, a comparator periodic output data pattern of 0, 1, 1, 1, 1, 0, 1 ,1, 1, 1, 0, a 3:2 pull-down source is detected indicating a 60 Hz NTSC format.

5. The method of claim 1, wherein if said video originated from an inherently interlaced signal:
if motion is not detected, pixels from the current and the previous fields are combined; and
if motion is detected, a new pixel value is interpolated using data from said current field only.

6. The method of claim 1, wherein said motion-adaptive sean rate conversion further comprises the steps of:
performing a temporal noise filtering of said interlaced image;
performing a flat-field low-pass filtering of said interlaced image;
performing a first and second field delay on said interlaced image;
obtaining a 9-bit motion image, consisting of a sign-bit and 8 magnitude bits, by subtracting said second delayed field from said interlaced image;
performing a fust non-linear pre-filtering of said motion image;
splitting said pre-filtered motion image along two paths, a 5-tap median filter path to reduce the impulse noise in the motion image and a parallel
3×3 low-pass filter path to remove Gaussian noise from the motion image;
determining a noise detection parameter for said image;
selecting the signal from said median filter path, by means of a multiplexer, if said noise detection parameter is greater than a preset edge threshold, indicating the presence of a motion edge or impulse noise,
selecting the signal from said low-pass filter path, by means of said multiplexer, if said noise detection parameter is equal to or less than said preset edge threshold, indicating the absence of a motion edge or impulse noise;
further reducing noise in said signal by zeroing out small positive and negative values, leaving only larger motion values;
converting the filtered motion value to a 4-bit absolute value;
passing said 4-bit value through a 5-pixel by 3-line spatial maximum filter to dilate said motion image, thereby improving spatial motion coverage;
further passing said dilated motion image from the current and previous fields through a 7-pixel by 5-line spatial-temporal maximum filter;
coring the 4-bit motion intensity values using a second non-linear filtering function; and
supplying said non-linear filtered image being supplied to a new field multiplexer.

7. The method of claim 6, wherein said noise detection further comprises the steps of:
- using said median filter in said scan rate converter to take the absolute difference between said 9-bit motion image and its 8-bit filtered value for each pixel of said image;
- summing said absolute differences over an entire field to obtain a single noise detection parameter; and
- using said noise detection parameter to determine the amount of noise filtering to apply to said interlaced image, where strong filtering is applied when the value of said noise detection parameter is large, and little to no filtering is applied when the value of said noise detection parameter is small.

8. The method of claim 6, wherein said 5-tap median filter is used for motion noise reduction to replace the current pixel intensity value with the median value from adjacent pixels in the current row, adjacent pixels in current column, and said current pixel.

9. The method of claim 8, wherein:
- the differences between the center tap (x,y) value and the non-center tap values (x+1,y),(x−1,y), (x,y+1), (x,y−1) are calculated;
- the absolute value of said differences are used to determine the optimum noise reduction filter to use for the current pixel (x,y) from the equation Out=median {(x, y−1), (x−1,y), (x,y), (x,y+1), (x+1,y)};
- in the presence of impulse noise the median filter is selected;
- in the presence of an edge the median filter is selected; and
- otherwise, the low-pass is selected to filter Gaussian noise.

10. The method of claim 6, wherein said 5-tap median filter is used for direction dependent video noise reduction to replace the current pixel intensity value with the median value from adjacent pixels in the row, correlated pixels in above and below rows, and said current pixel.

11. The method of claim 6, wherein said 3×3 low-pass filter has coefficients of ¼ for current pixel, ⅛ for adjacent pixels in the row, ⅛ for adjacent pixels in the column, and 1/16 for the four corner pixels.

12. The method of claim 6, wherein temporal noise reduction is recursive, applying the recursive equation $$y(T)=k^*x(T)+(1-k)^*y(T-1), \text{ where}$$

- x(T) is the current pixel, y(T) is the filtered pixel, y(T−1) is the filtered pixel from the previous pixel, and k is the recursive constant;
- a look-up table is used to determine how much temporal noise reduction will be performed for a given level of motion, said look-up table being used to map said motion intensity values to said recursive constant, k; and
- said temporal filter gradually turning off and said spatial filter gradually turning on as motion increases in the said image.

13. The method of claim 6, wherein a linear combination of said temporal noise reduction and spatial noise reduction is determined by examining the amount of motion for a particular pixel being processed, using the equation $$y(T)=k^*\text{spat\_filt}(T)+(1 k)^*\text{temp\_filt}(T), \text{ where}$$

- y(T) is the final filtered result, spat_flit (T) is the spatially filtered result, temp$_{13}$filt(T) is the temporally filtered result, and k is the distribution content;
- a look-up table is used to map said motion intensity values to said distribution constant, k; and
- said distribution gradually moves from temporally filtered data to spatially filtered data as motion increases in said image.

14. The method of claim 1, wherein said edge detection, determined in parallel with said motion intensity determination, further comprises the steps of:
- taking the absolute value of the luminance differences between pixels consisting of the group: {(x,y)−(x−1,y−1)}, {(x,y)−(x,y−1)}, {(x,y)−(x+1,y−1)}, {(x−1,y)−(x−1,y−1)}, {(x−1,y)−(x,y −1)}, {(x+1,y)−(x,y−1)}, {(x,y)−(x+1,y)}, {(x,y)−(x+1,y+1)}, {(x,y)−(x,y+1)}, {(x,y)−(x,y+1)}, {(x,y)−(x−1,y−1)}, {(x,y)−(x−1,y)};
- wherein if said difference between two pixels is greater than a pre-determined threshold, it is assumed that an edge exists between said pixels; and
- conversely, where the difference between two pixels is less than said pre-determined threshold, it is assumed that the two pixels lie on an edge.

15. The method of claim 14, wherein two types of edges are identified from a group consisting of:
- an edge between two lines within a field to be used for interpolation; and
- an edge among three lines within a field to be used for spatial noise reduction.

16. The method of claim 15, wherein the minimum from {(x,y)−(x−1,y−1)}, {(x,y) −(x,y−1)}, {(x,y)−(x+1,y−1)}, {(x−1,y)−(x+1,y−1)}, {(x+1,y)−(x−1,y−1)}, {(x−1 ,y)−(x, y−1)}, {(x+1,y)−(x,y−1)} is used to determine an edge for said interpolation to preserve vertical detail in the image.

17. The method of claim 16, wherein:
- the average of the differences {(x,y)−(x−1,y−1)} and {(x+1,y)−(x, y−1)} is used to detect an edge having a slope of 63 degrees;
- the average of the differences {(x,y)−(x+1,y−1)} and {(x+1,y)−(x−1,y−1)} is used to detect an edge having a slope of 117 degrees;
- the difference {(x+1,y)−(x−1,y−1)} is used to detect an edge having a slope of 135 degrees;
- the difference {(x,y)−(x,y−1)} is used to detect an edge having a slope of 90 degrees; and
- the difference {(x−1,y)−(x+1,y−1)} is used to detect an edge having a slope of 45 degrees.

18. The method of claim 17, wherein:
- the differences between the center tap (x,y) value and the non-center tap values (x−1y−1), (x,y−1), (x+1,y−1), (x−1,y+1), (x,y+1), and (x+1, 1 y+1) are calculated; and
- the absolute value of said differences are used to determine the optimum taps to use for the median filter, whereby the upper tap location is determined by finding the minimum of the upper differences and the lower tap location is determined by finding the minimum of the lower differences.

19. The method of claim 14, wherein if all said differences are less than said pre-determined threshold, it is assumed that an edge is not present and interpolation is done along the edge defined between pixels (x,y) and (x,y−1).

20. The method of claim 14, wherein if all said differences {(x,y)−(x−1,y−1)}, {(x,y)−(x+1,y−1)}, {(x−1,y)−(x+1,y−1)}, {(x+1,y)−(x−1,y−1)}, {(x−1,y)−(x,y−1)}, {(x+1,y)−(x, y−1)} are all less than said pre-determined threshold, it is assumed that correlation is present in opposing directions and interpolation is performed along the edge defined by difference {(x,y)−(x,y−1)}.

21. The method of claim 14, wherein:

the minimum among differences {(x,y)−(x−1,y−1)}, {(x,y)−(x,y−1)}, {(x,y)−(x,+1,y−1)}, {(x,y)−(x+1,y)},{(x,y)−(+1,y+1)},{(x,y)−(x,y+1)},{(x,y)−(x−1,y−1)},{(x,y)−(x−1,y)}is used to determine if an edge is present for said spatial noise reduction filtering, where the pixel at the center of these differences is the pixel to be filtered;

if all these differences are less than a pre-determined threshold it is assumed that an edge is not present and a two-dimensional low-pass filter is used; and if a difference is greater than said pre-determine threshold it is assumed that an edge is present and a direction dependent 5-tap median filter is used.

22. The method of claim 21, wherein the location of the taps of said direction dependent median filter is determined by finding the minimum among the differences {(x,y)−(x−1,y−1)}, {(x,y)−(x,y−1)}, {(x,y)−(x+1,y−1)}, {(x,y)−(x+1,y+1)},{(x,y)−(x,y+1)},{(x,y)−(x−1,y+1)}.

23. The method of claim 14, wherein interpolation is performed on the filtered field along said detected edges, using a linear combination of the previous field and a newly created interpolated field according to the equation $$z(T)=k^*x(T)+(1-k)^*y(T), \text{ where}$$

z(T) is the output pixel to be combined with the current field, x(T) is a pixel from the interpolated field, y(T−) is a pixel from the previous field, and k is the interpolation constant for the current pixel; and a look-up table is used to map said motion intensity values to said interpolation constant, k.

24. An apparatus for content-dependent interlaced video to progressive video conversion with adaptive noise reduction, said apparatus comprising:

a temporal noise reduction and low-pass filter to receive said interlaced video;

first and second field delay buffers being coupled sequentially to the output of said temporal noise reduction and low-pass filter;

a first difference amplifier operatively coupled to receive said input interlaced video and output from said second field delay buffer;

a first non-linear filter coupled to the output of said first difference amplifier;

the output of said first non-linear filter operatively coupled in parallel to the input of a median filter and the input of a 3 x 3 low-pass filter;

the output of said low-pass filter and a first output of said median filter coupled to first and second inputs of a multiplexer;

a second noise filter select output from said median filter coupled to a third input of said multiplexer;

the output of said multiplexer coupled to a noise detection circuit, the output of said circuit being a 4-bit absolute number;

the output of said 4-bit noise detection circuit coupled to the input to a 5-pixel by 3-line spatial maximum filter;

the output of said spatial maximum filter coupled to a first input of a 5-pixel by 7-line spatial-temporal maximum filter and to the input of a third field delay buffer;

the output of said third delay buffer coupled to a second input of said 5-pixel by 7-line temporal maximum filter;

the output of said 5-pixel by 7-line temporal maximum filter coupled to the input of a second non-linear output filter; and the output of said second non-linear filter operatively coupled to one input of a new field multiplexer.

25. The apparatus of claim 24, further comprising a 2:2 50 Hz video pull-down function, wherein:

an input video luminance signal being filtered and passed through said first and second field delay buffer;

the outputs of said first and said second field buffers operatively coupled to first and second inputs of a second difference amplifier;

the output of said second difference amplifier being coupled to the input of a reverse 2:2 counter, supplying the absolute difference value of said first and second field delays;

a first output of said 2:2 counter coupled to a first input of a first A≦B comparator;

a second output of said 2:2 counter being coupled to the input of a fourth field delay buffer;

the output of said third fourth field delay buffer coupled to a second input to said first A ≦B comparator; and the output of said A≦B comparator coupled to the first input of a film mode state machine, operatively providing a 2:2 motion detection signal.

26. The apparatus of claim 24, further comprising a 3:2 60 Hz video pull-down function, wherein:

an input video luminance signal, being filtered based on a pixel-by-pixel basis by a data content process, being truncated to 1-bit and operatively coupled to a reverse 3:2 counter;

the output of said 3:2 counter coupled to a first input of a second A≦B comparator;

a 3:2 lock threshold signal being provided to a second input of said second A≦B comparator;

the output of said A≦B comparator coupled to a second input of a film mode state machine; and film mode lock and jam direction outputs being operatively coupled to respective inputs of said new field multiplexer.

27. The apparatus of claim 24, further comprising video edge detection circuitry, wherein:

an input video luminance signal is filtered and passed through said first field delay buffer;

the output of said buffer coupled to the input of an edge detection circuit;

a first data output of said edge detection circuit coupled to a first input of a motion, edge adaptive, spatial noise reduction, and interpolation circuit;

a second interpolation filter select output of said edge detection circuit coupled to a second input of said motion, edge adaptive, spatial noise reduction, and interpolation circuit;

a third spatial select output of said edge detection circuit coupled to a second input of said motion, edge adaptive, spatial noise reduction, and interpolation circuit;

a fourth filter direction output of said edge detection circuit coupled to a fourth input of said motion, edge adaptive, spatial noise reduction, and interpolation circuit;

a field delayed version of the motion process video signal with adaptive noise reduction operatively coupled to a fifth input of said motion, edge adaptive, spatial noise reduction, and interpolation circuit;

the output of said motion, edge adaptive, spatial noise reduction, and interpolation circuit operatively coupled to an input of said new field multiplexer;

the output of said new field multiplexer being coupled to a first input of an up converter circuit;

the output of said field delay buffer coupled to a second input of said up converter circuit; and the output of said up converter circuit providing a new luminance frame progressive video output signal.

28. A projection display system having content-dependent scan rate converter video with adaptive noise reduction, comprising:

a first output of a projection system controller coupled to up to three spatial light modulator devices;

a second output of said projection system controller coupled to a lamp power supply, said power supply controlling the brightness of said lamp;

white light from said lamp being process and focusing red, green, blue light on the surface of respective spatial light modulators;

said spatial light modulators, under control of said projection system controller, modulating said red, green, blue light, said modulated light being projected from surfaces of ON pixels of said spatial light modulators into a projection lens;

light from surfaces of OFF pixels of said spatial light modulator being reflected into a light trap;

magnified light from said projection being focused on to a viewing screen;

an interlaced video source being supplied to a content-dependent scan rate converter with adaptive noise reduction capability, said video being processed on a pixel-by-pixel basis and supplied as progressive video to the input of said projection system controller.

29. The system of claim 28, wherein said content-dependent scan rate converter receives interlaced video from a source selected from a group consisting of an inherently interlaced 50 Hz signal, an inherently interlaced 60 Hz signal, a 50 Hz interlaced signal being provided from 24 Hz film mode source by a 2:2 pull-down converter, or a 60 Hz interlaced signal being provide from 24 Hz film mode source by a 3:2 pull-down converter.

30. The system of claim 29, wherein said 50 Hz video pull-down function, further comprises:

an input video luminance signal being filtered and passed through a first and second field delay buffer;

the outputs of said first and said second field buffers operatively coupled to first and second inputs of a second difference amplifier;

the output of said second difference amplifier being coupled to the input of a reverse 2:2 counter, supplying the absolute difference value of said first and second field delays;

a first output of said 2:2 counter coupled to a first input of a first $A \leq B$ comparator;

a second output of said 2:2 counter being coupled to the input of a third field delay buffer;

the output of said third field delay buffer coupled to a second input to said first $A \leq B$ comparator; and the output of said $A \leq B$ comparator coupled to the first input of a film mode state machine, operatively providing a 2:2 motion detection signal.

31. The system of claim 29, wherein said 60 Hz video pull-down function, further comprises:

an input video luminance signal, being filtered based on a pixel-by-pixel basis by a data content process, being truncated to 1-bit and operatively coupled to a reverse 3:2 counter;

the output of said 3:2 counter coupled to a first input of a second $A \leq B$ comparator;

a 3:2 lock threshold signal being provided to a second input of said second $A \leq B$ comparator;

the output of said $A \leq B$ comparator coupled to a second input of a film mode state machine; and film mode lock and jam direction outputs being operatively coupled to respective inputs of a new field multiplexer.

32. The system of claim 29, comprising:

a filter for filtering an input video luminance signal;

a first field delay buffer receiving said filtered video luminance signa, the output of said buffer coupled to the input of an edge detection circuit;

a first data output of said edge detection circuit coupled to a first input of a motion, edge adaptive, spatial noise reduction, and interpolation circuit;

a second interpolation filter select output of said edge detection circuit coupled to a second input of said motion, edge adaptive, spatial noise reduction, and interpolation circuit;

a third spatial select output of said edge detection circuit coupled to a second input of said motion, edge adaptive, spatial noise reduction, and interpolation circuit;

a fourth filter direction output of said edge detection circuit coupled to a fourth input of said motion, edge adaptive, spatial noise reduction, and interpolation circuit;

a field delayed version of the motion process video signal with adaptive noise reduction operatively coupled to a fifth input of said motion, edge adaptive, spatial noise reduction, and interpolation circuit;

the output of said motion, edge adaptive, spatial noise reduction, and interpolation circuit operatively coupled to an input of a new field multiplexer;

the output of said new field multiplexer being coupled to a first input of an up converter circuit;

the output of said field delay buffer coupled to a second input of said up converter circuit; and the output of said up converter circuit providing a new luminance frame progressive video output signal.

33. The system of claim 28, wherein said scan rate converter further comprises:

a temporal noise reduction and low-pass filter to receive said interlaced video;

first and second field delay buffers being coupled sequentially to the output of said temporal noise reduction and low-pass filter;

a first difference amplifier operatively coupled to receive said input interlaced video and output from said second field delay buffer;

a first non-linear filter coupled to the output of said first difference amplifier;

the output of said first non-linear filter operatively coupled in parallel to the input of a median filter and the input of a 3×3 low-pass filter;

the output of said low-pass filter and a first output of said median filter coupled to first and second inputs of a multiplexer;

a second noise filter select output from said median filter coupled to a third input of said multiplexer;

the output of said multiplexer coupled to a noise detection circuit, the output of said circuit being a 4-bit absolute number;

the output of said 4-bit noise detection circuit coupled to the input to a 5-pixel by 3-line spatial maximum filter;

the output of said spatial maximum filter coupled to a first input of a 5-pixel by 7-line spatial-temporal maximum filter and to the input of a third field delay buffer;

the output of said third delay buffer coupled to a second input of said 5-pixel by 7-line temporal maximum filter;

the output of said 5-pixel by 7-line temporal maximum filter coupled to the input of a second non-linear output filter; and the output of said second non-linear filter operatively coupled to one input of a new field multiplexer.

* * * * *